(12) United States Patent
Furuya et al.

(10) Patent No.: US 7,791,790 B2
(45) Date of Patent: Sep. 7, 2010

(54) WAVELENGTH CONVERTER

(75) Inventors: Hiroyuki Furuya, Nara (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 226 days.

(21) Appl. No.: 12/092,694

(22) PCT Filed: Nov. 1, 2006

(86) PCT No.: PCT/JP2006/321862

§ 371 (c)(1),
(2), (4) Date: May 5, 2008

(87) PCT Pub. No.: WO2007/052702

PCT Pub. Date: May 10, 2007

(65) Prior Publication Data

US 2009/0251766 A1     Oct. 8, 2009

(30) Foreign Application Priority Data

Nov. 4, 2005   (JP) .............................. 2005-320397

(51) Int. Cl.
 *G02F 1/35* (2006.01)
 *G02F 2/02* (2006.01)
(52) U.S. Cl. .................... 359/328; 359/332; 372/22
(58) Field of Classification Search ......... 359/326–332; 372/6, 21, 22
See application file for complete search history.

(56) References Cited

U.S. PATENT DOCUMENTS 5,682,398 A  *  10/1997  Gupta .................... 372/22

FOREIGN PATENT DOCUMENTS

JP     11-38460     2/1999

(Continued)

OTHER PUBLICATIONS

International Search Report issued Jan. 23, 2007 in International (PCT) Application No. PCT/JP2006/321862.

(Continued)

*Primary Examiner*—Daniel Petkovsek
(74) *Attorney, Agent, or Firm*—Wenderoth, Lind & Ponack, L.L.P.

(57) ABSTRACT

A wavelength converter including a fiber provided with a laser active substance and formed with first and second fiber gratings embedded in the fiber, a laser light source that allows pumping light to be incident on the fiber, a laser resonator formed by optically connecting the fiber and the laser light source, and a wavelength conversion element that converts the fundamental wave of a laser beam emitted from the laser resonator into a higher harmonic wave. The fiber absorbs a part of an output of the fundamental wave or the pumping light, and heats the second fiber grating. The temperature of the second fiber grating is adjusted in accordance with an output of the higher harmonic wave outputted from the wavelength conversion element.

27 Claims, 26 Drawing Sheets

U.S. PATENT DOCUMENTS

| | | | |
|---|---|---|---|
| 5,982,791 A * | 11/1999 | Sorin et al. | 372/25 |
| 6,510,167 B1 | 1/2003 | Jain et al. | |
| 6,594,288 B1 * | 7/2003 | Putnam et al. | 372/3 |
| 7,103,075 B2 * | 9/2006 | Tojo et al. | 372/22 |
| 7,142,572 B2 * | 11/2006 | Tojo | 372/32 |

FOREIGN PATENT DOCUMENTS

| | | |
|---|---|---|
| JP | 2004-20571 | 1/2004 |
| JP | 2004-165389 | 6/2004 |
| JP | 2005-10340 | 1/2005 |
| JP | 2005-115192 | 4/2005 |
| JP | 2005-181509 | 7/2005 |

OTHER PUBLICATIONS

H. Furuya et al., Continuous wave 3W green generation by bulk MgO:LiNbO$_3$ periodically poled SHG device, Stora+ge Media Systems Development Center, No. 3, 3, 2005, p. 1331.

A. Bouchier et al., "Singe-mode Yb-doped fiber laser at 980 nm for efficient frequency-doubling", Conference on Lasers and Electro-Optics (CLEO), 2005 vol, 3, May 2005, pp. 1995-1997.

* cited by examiner

WAVELENGTH CONVERTER

BACKGROUND OF THE INVENTION

1. Technical Field

The present invention relates to a wavelength converter which is capable of obtaining a stable high output by combining a fiber laser and a wavelength conversion element.

2. Description of the Related Art

An intensely-monochromatic high-output visible light source is needed for realizing a large-sized display, a high-intensity display, or the like. Among the three primary colors of red, green and blue, in terms of a red light source, a red high-output semiconductor laser used for a DVD recorder or the like is available as a productive small-sized light source. However, a green or blue light source is difficult to realize in a semiconductor laser or the like, thus raising a demand for a productive small light source.

As such a light source, a wavelength converter obtained by combining a fiber laser and a wavelength conversion element is realized as a low-output visible light source. As a pumping light source which excites the fiber laser, a semiconductor laser is used, and a non-linear optical crystal is used as the wavelength conversion element. Such a green or blue light source is well known.

FIG. 25 shows a schematic configuration of a conventional wavelength converter 10. A laser beam from a fiber-pumping semiconductor laser 1 couples, through a lens 2, with an optical fiber 3 having a grating portion 6 embedded therein. Inside of this coupling, the laser beam goes back and forth repeatedly, so that an optical resonator is made up of the semiconductor laser 1 and the grating portion 6 of the optical fiber 3. This optical resonator emits a laser beam, and the laser beam is incident through a lens 4 upon a wavelength conversion element 5. Then, it is converted into a second harmonic wave and is emitted from the opposite plane to the incidence plane of the wavelength conversion element 5. At this time, the whole system's environment temperature changes, and the internal temperature of each member is raised. The wavelength band which can be converted by the wavelength conversion element 5 is approximately 0.1 nm, and this narrow band hinders the incidence light's wavelength from matching with the wavelength convertible by the wavelength conversion element 5. Hence, there is a disadvantage in that a stable output cannot be obtained from the wavelength conversion element 5.

In order to resolve this disadvantage, in an example shown in FIG. 25, a temperature-sensitive flexible member 7 which expands and contracts according to fluctuation in the temperature is expanded and contracted via a fixation portion 8 and a fixation portion 9 in the longitudinal directions of the grating portion 6 of the optical fiber 3. Thereby, the wavelength of light emitted from the optical resonator made up of the semiconductor laser 1 and the optical fiber 3 makes a change. Hence, even if the temperature change of the wavelength conversion element 5 varies the incident light's center wavelength convertible by the wavelength conversion element 5, that can be followed up. Such a follow-up system is presented (e.g., refer to Patent Document 1 and Patent Document 2).

Furthermore, using a temperature control circuit, the temperature of a polarization maintaining-type optical fiber is controlled so as to be kept constant. This makes it possible to obtain a stable output from a wavelength conversion element (e.g., refer to Patent Document 3).

Moreover, the temperature of a grating portion is detected by a temperature-sensitive element. Then, using a Peltier element, the temperature of a wavelength conversion element is controlled so that the wavelength conversion element's convertible wavelength band is included within the grating portion's reflection wavelength band at the detected temperature. Thereby, regardless of a change in the environment temperature or the like, a stable light output can be obtained from the wavelength conversion element (e.g., refer to Patent Document 4).

However, in the above described conventional wavelength converters, the wavelength variations according to the temperature change inside of such an optical-fiber grating portion and such a wavelength conversion element are 0.01 nm/K and 0.05 nm/K, respectively, different from each other. Therefore, if the internal temperature changes significantly, the wavelength selected in the grating portion goes far away from the wavelength convertible by the wavelength conversion element. When one tries to obtain low-output wavelength conversion light having an output of several hundred milli-watts or below, the methods according to the above described prior arts are effective. On the other hand, when one tries to obtain high-output wavelength conversion light of class W, particularly, the wavelength conversion element's internal temperature rises significantly to cause undue wavelength variation. As a result, in any method set forth in those prior arts, it will be difficult to adjust the temperature or the wavelength. This makes it hard to obtain a high class-W output.

In addition, the inventors of the present invention devotedly studied the destruction and degradation of a crystal which can be caused when a higher harmonic wave of several watts is generated. Consequently, the inventors found the cause of the destruction and degradation of a crystal in a principle totally different from any conventional optical damage. Hereinafter, the cause of such new crystal destruction and degradation will be described in detail.

A quasi phase-matching element (or QPM-LN element) formed by using Lithium Niobate crystal (or LN) or Lithium Tantalate (or LT) has a non-linear optical constant greater than an LBO crystal or a KTP crystal. This makes it possible to conduct an efficient and high-output wavelength conversion. In the QPM-LN element, however, optical energy has to be concentrated on a narrow area. Therefore, in practice, the destruction and degradation of a crystal by the fundamental wave or the generated second harmonic wave is more likely to occur than the KTP crystal.

In the case where a higher harmonic wave of several watts is obtained, the above described greater non-linear optical constant contributes to generating ultraviolet light (i.e., a third harmonic wave) which corresponds to the sum frequency of infrared light corresponding to the fundamental wave and green light (i.e., the second harmonic wave) obtained after the conversion, even if it does not meet a phase-matching condition. It was found out that this generated ultraviolet light triggers off absorption of the green light, thereby bringing about saturation of a green high output and crystal destruction. In this specification, the destruction of a crystal by this ultraviolet light (i.e., the third harmonic wave) is called crystal destruction by ultraviolet induced green-light absorption (or UVIGA), and thus, it is distinguished from the conventional optical damage.

FIG. 26 shows a measurement value and a theoretical value of the input-output characteristic of a conventional wavelength conversion element formed by using an $LiNbO_3$ crystal including Mg added with 5.0 mol %. In this figure, the wavelength of a fundamental wave used in a measurement and a calculation is 1084 nm, and the element's length is 25 mm. The theoretical value is calculated using a method described in "T. Suhara and M. Fujimura: Waveguide Nonlinear-Optic Devices (Springer, Berlin, 2003)", and a value which corresponds to each element is used for a conversion efficiency or the like.

As shown in FIG. 26, in the conventional wavelength conversion element formed by using the $LiNbO_3$ crystal including Mg added with 5.0 mol %, the input-output characteristic for the theoretical value is indicated by a curve CR. The input is almost proportional to the output. On the other hand, the input-output characteristic for the measurement value is indicated by a curve CE. In an interval r1 where a green light output is below 1 W, the curve CR coincides almost with the curve CE. In contrast, in an interval r2 where the green light output is 1 W or above, the curve CE strays off the curve CR and the green light output becomes lower. Further, in an interval r3 where the green light output is 1.75 W or above, the curve CE strays far away from the curve CR and the green light output becomes unstable. As a result, in the conventional wavelength conversion element, it can be seen that if its output becomes equal to, or higher than, 1 W, then the ultraviolet induced green-light absorption is conspicuously caused.

As is varied according to elements, in the case where green light is generated, when an output of 1 W or above is generated, crystal destruction by the ultraviolet induced green-light absorption begins to occur. In the case where short-wavelength blue light is generated, the threshold of crystal destruction falls. If it becomes 0.1 W or above, crystal destruction by the ultraviolet induced green-light absorption begins to occur. In this way, the ultraviolet induced green-light absorption also causes undue wavelength variation and lowers the output of wavelength conversion light. This makes it difficult to obtain a high class-W output.

Patent Document 1: Japanese Patent Laid-Open No. 2004-165389 specification

Patent Document 2: Japanese Patent Laid-Open No. 2005-115192 specification

Patent Document 3: Japanese Patent Laid-Open No. 2005-181509 specification

Patent Document 4: Japanese Patent Laid-Open No. 2005-10340 specification

SUMMARY OF THE INVENTION

It is an object of the present invention to provide a wavelength converter which is capable of stably obtaining high-output wavelength conversion light from a wavelength conversion element, even though its environment temperature changes.

A wavelength converter according to an aspect of the present invention includes: a laser resonator which is formed by optically connecting a fiber that includes a laser active substance and is formed with two fiber gratings, and a laser light source that allows pumping light to be incident on the fiber; and a wavelength conversion element which converts the fundamental wave of a laser beam emitted from the laser resonator into a higher harmonic wave, the fiber gratings including a first fiber grating on the side of the laser light source and a second fiber grating on the side of the wavelength conversion element, and the temperature of the second fiber grating being adjusted in accordance with the output of a higher harmonic wave outputted from the wavelength conversion element.

In this wavelength converter, the temperature of the second fiber grating on the side of the wavelength conversion element is adjusted in accordance with the output of a higher harmonic wave outputted from the wavelength conversion element. Therefore, the second fiber grating's temperature can be more significantly raised than any conventional one, so that the fundamental wave's wavelength can be largely shifted. As a result, the fundamental wave's wavelength can be shifted so as not to separate from the wavelength which can be converted by the wavelength conversion element. This makes it possible to stably obtain high-output wavelength conversion light from the wavelength conversion element.

DETAILED DESCRIPTION OF THE INVENTION

Figure 1:
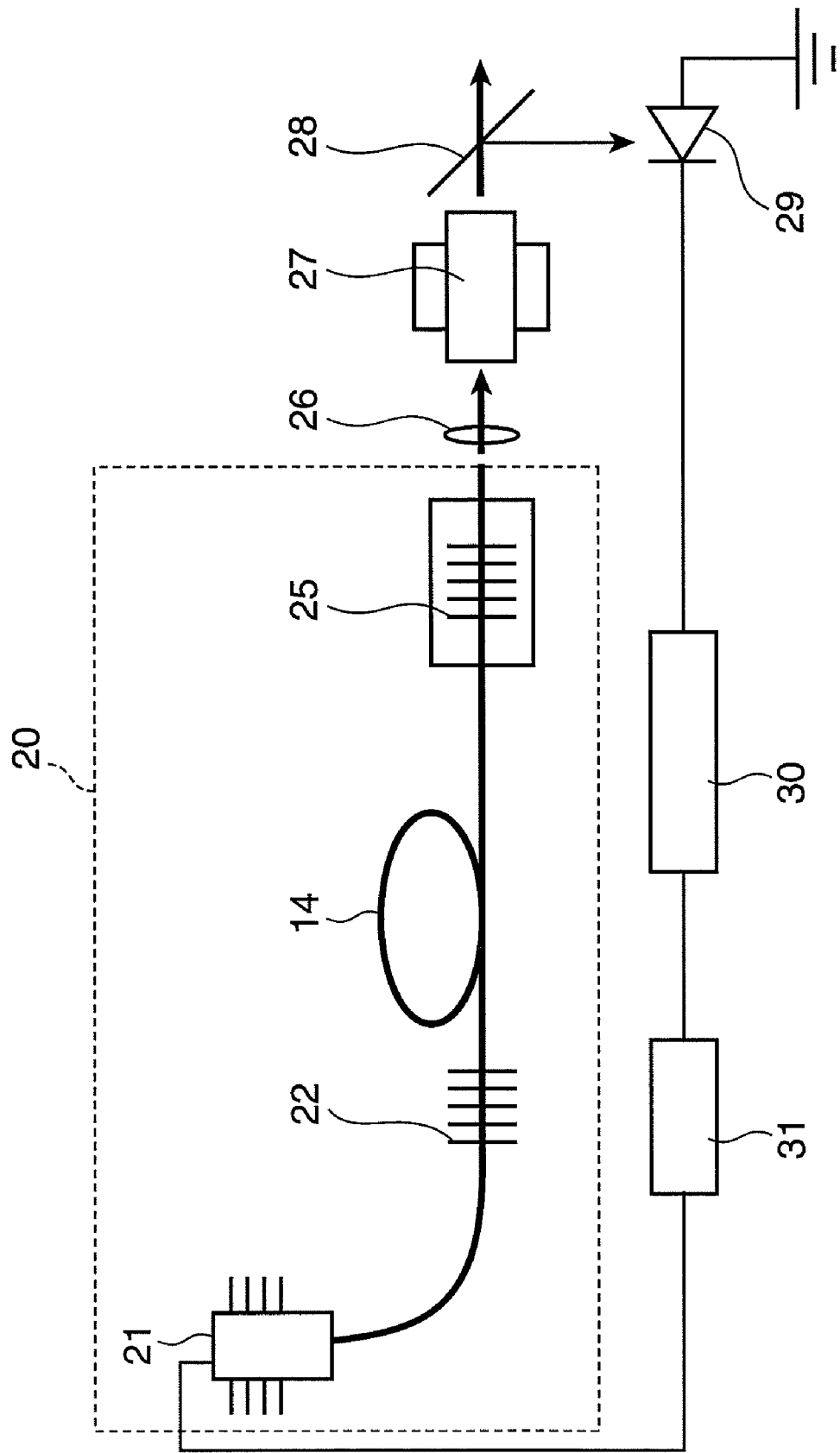
FIG. 1 is a block diagram, showing a schematic configuration of a wavelength converter according to a first embodiment of the present invention.

Hereinafter, a wavelength converter according to each embodiment of the present invention will be described with reference to the drawings. In each figure, component elements are given the same reference characters and numerals, as long as they are identical to each other. A description of such a component element is often omitted.

First Embodiment

FIG. 1 is a block diagram, showing a schematic configuration of a wavelength converter according to a first embodiment of the present invention. The wavelength converter shown in FIG. 1 includes a fiber laser 20, a lens 26, a wavelength conversion element 27, a beam splitter 28, a photo-detector 29, an output controller 30, and a laser current source 31 for pumping. The fiber laser 20 is formed by a laser light source 21 which allows pumping light to be incident on a fiber (i.e., an optical fiber) 14. The fiber 14 has a fiber grating 22 and a fiber grating 25 embedded therein.

First, a basic laser operation will be described of the fiber laser 20. As shown in FIG. 1, pumping light from the laser light source 21 is incident upon the fiber 14 from an end thereof. The incident pumping light is absorbed into a laser active substance included in the fiber 14, and thereafter, the seed light of a fundamental wave is generated inside of the fiber 14. This fundamental-wave seed light reflects and goes back and forth repeatedly inside of a laser resonator which includes the fiber grating 22 and the fiber grating 25 of the fiber 14 as a pair of reflection mirrors. At the same time, the seed light is amplified and intensified by the laser active substance included in the fiber 14 and reaches a laser oscillation. Incidentally, the laser light source 21 is driven with the electric current of the pumping laser-current source 31.

Next, a basic operation will be described of the wavelength converter shown in FIG. 1. In such a way as described above, a laser beam is outputted from the fiber laser 20, and the laser beam is incident through the lens 26 upon the wavelength conversion element 27. The laser beam from the fiber laser 20 becomes the fundamental wave, and through the non-linear optical effect of the wavelength conversion element 27, this fundamental wave is converted into a higher harmonic wave. This higher harmonic wave is partly reflected by the beam splitter 28, but the higher harmonic wave which has passed through it turns to the light outputted by the wavelength converter.

The higher harmonic wave which has partly reflected at the beam splitter 28 is received by the photo-detector 29 and is converted into an electric signal for monitoring the wavelength converter's output light. In order to make this electric signal's strength a strength for obtaining a desirable output from the wavelength converter, the output controller 30 controls the pumping laser-current source 31 so that the electric current for driving the laser light source 21 can be adjusted. Thereby, the pumping light's intensity from the laser light source 21 is adjusted, and thus, in the fiber laser 20, its fundamental wave's output intensity is adjusted. As a result, the wavelength conversion light's output intensity is adjusted which is outputted from the wavelength converter. This helps keep the wavelength converter's output intensity at a constant level, in other words, stabilize so-called automatic power control (hereinafter, referred to simply as the "APC").

Next, how the wavelength converter of FIG. 1 outputs a visible green laser beam will be described in detail. In the fiber laser 20, the core part of the fiber 14 is doped with a rare earth element Yb as the laser active substance at a concentration of 10000 ppm. As the laser light source 21 for fiber pumping, a semiconductor laser is used which has a wavelength of 195 nm and a maximum output of 30 W. When the pumping light from the laser light source 21 is incident upon the fiber 14, this pumping light is absorbed into the core part. Using the level of Yb in the core part, induced emission at a wavelength of approximately 1060 nm occurs from the fiber 14. This induced emission light with a wavelength of approximately 1060 nm is amplified by the laser active substance. Then, it goes ahead inside of the fiber 14 and becomes a fundamental wave. Besides, because the fiber grating 22 and the fiber grating 25 function as the reflection mirrors of the laser resonator, the fundamental wave goes and returns between the reflection mirrors. Thereby, the wavelength can be selected. At this time, the reflection wavelength bands of the fiber grating 22 and the fiber grating 25 are set to have a width of 1 to 5 nm and 0.1 nm, respectively. Hence, the fundamental wave's wavelength-band width becomes 0.1 nm, and this fundamental wave is outputted from the fiber laser 20.

The fundamental wave with a wavelength of approximately 1060 nm which is outputted from the fiber laser 20 is incident through the lens 26 upon the wavelength conversion element 27. The wavelength conversion element 27 is an element which converts the incident light into a second harmonic wave and outputs it. Herein, a cyclic polarization inversion MgO:LiNbO$_3$ crystal is used which has a length of 10 mm. Herein, in the wavelength conversion element 27, the wavelength which can be converted into a higher harmonic wave is called a phase matching wavelength. In this embodiment, it is set at approximately 1060 nm at 25° C. Hence, the wavelength of approximately 1060 nm of the fundamental wave in the fiber laser 20 coincides with the phase matching wavelength. The fundamental wave is converted into the higher harmonic wave in the wavelength conversion element 27. Thus, it turns into a green laser beam whose wavelength is approximately 530 nm that is equivalent to half the former wavelength. Then, it is outputted from the wavelength converter. In general, in the wavelength conversion element 27, the phase matching wavelength varies sensitively according to this element's temperature, and thus, its temperature is controlled with a precision of 0.01° C. As is omitted in the figure, in this embodiment alike, a Peltier element is attached to the wavelength conversion element 27, so that the wavelength conversion element 27's temperature can be controlled with a precision of 0.01° C. Thereby, a green laser beam having an output of several hundred milli-watts can be obtained using a fundamental-wave output of 3 to 4 W or below of the fiber laser 20.

However, if one tries to obtain a green laser beam with a higher output, or an output of several watts or above, from the wavelength converter, then it is difficult to match the wavelength of the fundamental wave of the fiber laser 20 to the phase matching wavelength of the wavelength conversion element 27. Specifically, if the output of the fundamental wave incident on the wavelength conversion element 27 becomes 3 to 4 W or above, the wavelength conversion element 27's internal temperature rises sharply. Besides, in general, the rate of a variation in wavelength according to the internal temperature of a fiber grating and a wavelength conversion element are 0.01 nm/K and 0.05 nm/K, respectively. Thereby, compared with the case where the fundamental wave has a low output of 3 to 4 W or below, if the fundamental wave 5 exceeds to 10 W, then the length of a shift in the wavelength of the fundamental wave in accordance with the temperature rise separates largely from the length of a shift in the phase matching wavelength in accordance with the temperature rise. On top of this, the shift length contributes to going beyond the range where the wavelength conversion element 27's temperature can be precisely controlled using the Peltier element.

Therefore, the internal temperature of the fiber grating 25 for selecting a wavelength for the fundamental wave is further raised to expand the fiber grating 25 thermally and widen its grating interval. Thereby, the shift in the wavelength of the fundamental wave becomes longer, so that the shift length in the wavelength of the fundamental wave can be matched to the shift length in the phase matching wavelength in accordance with the temperature rise. In order to implement this, the fiber grating 25 of FIG. 1 needs to be heated to raise its internal temperature.

In this embodiment, the fiber 14 is doped with a rare earth element, so that a part of the fundamental wave or the pumping light can be absorbed. Then, the fiber grating 25 is heated. Specifically, the clad part of the fiber 14 is doped with the rare earth element Yb at a concentration of 20000 to 30000 ppm. Using the level of Yb, leakage light of the fundamental wave or a part of the pumping light is absorbed to produce heat. Thereby, the fiber grating 25 is heated to raise its internal temperature.

The core part of the fiber 14 is doped with the rare earth element Yb as the laser active substance for absorbing the pumping light and generating the fundamental wave as described above, at a concentration of 10000 ppm. In terms of the rare-element Yb of the core-part of the fiber 14, the fundamental wave is generated mainly from the pumping light. Hence, the heating effect on the fiber grating 25 becomes less.

As described above, in this embodiment, the clad part of the fiber 14 is doped with the rare earth element Yb at a concentration of 20000 to 30000 ppm, so that a part of the output of the laser-beam fundamental wave or pumping light can be absorbed. Then, it is heated with the heat produced through the absorption, so that the temperature of the fiber grating 25 can be raised. Herein, the output of the green laser beam outputted from the wavelength conversion element 27 is proportional to the output of the fundamental wave outputted from the fiber laser 20. Thus, the quantity of heat produced by absorbing a part of the output of the laser-beam fundamental wave or pumping light is supposed to be proportional to the output of the green laser beam. This means that the temperature of the fiber grating 25 is adjusted in response to the output of the green laser beam outputted from the wavelength conversion element 27. As a result, the temperature of a fiber grating rises more significantly than in any conventional case, so that its grating interval becomes wider. Therefore, the wavelength of the fundamental wave is largely shifted so as not to go away from the wavelength which can be converted by the wavelength conversion element 27. This makes it possible to obtain a stable high class-W output.

Incidentally, it is preferable that the fiber-doping rare earth element for heating be at least one chosen from among Nd, Er, Dy, Pr, Tb and Eu. This rare earth element should preferably be used for doping at a concentration of 1000 to 3000 ppm. In this case, if the chosen rare earth element is used for doping at a set concentration, the fiber grating 25 can be more effectively heated.

Furthermore, the rare earth element may be at least one chosen from among Yb, Ce, Tm, Ho, Gd, Y and La. This rare earth element should preferably be used for doping at a concentration of 20000 to 30000 ppm. Likewise in this case, if the chosen rare earth element is used for doping at a set concentration, the fiber grating 25 can be more effectively heated.

Figure 26:
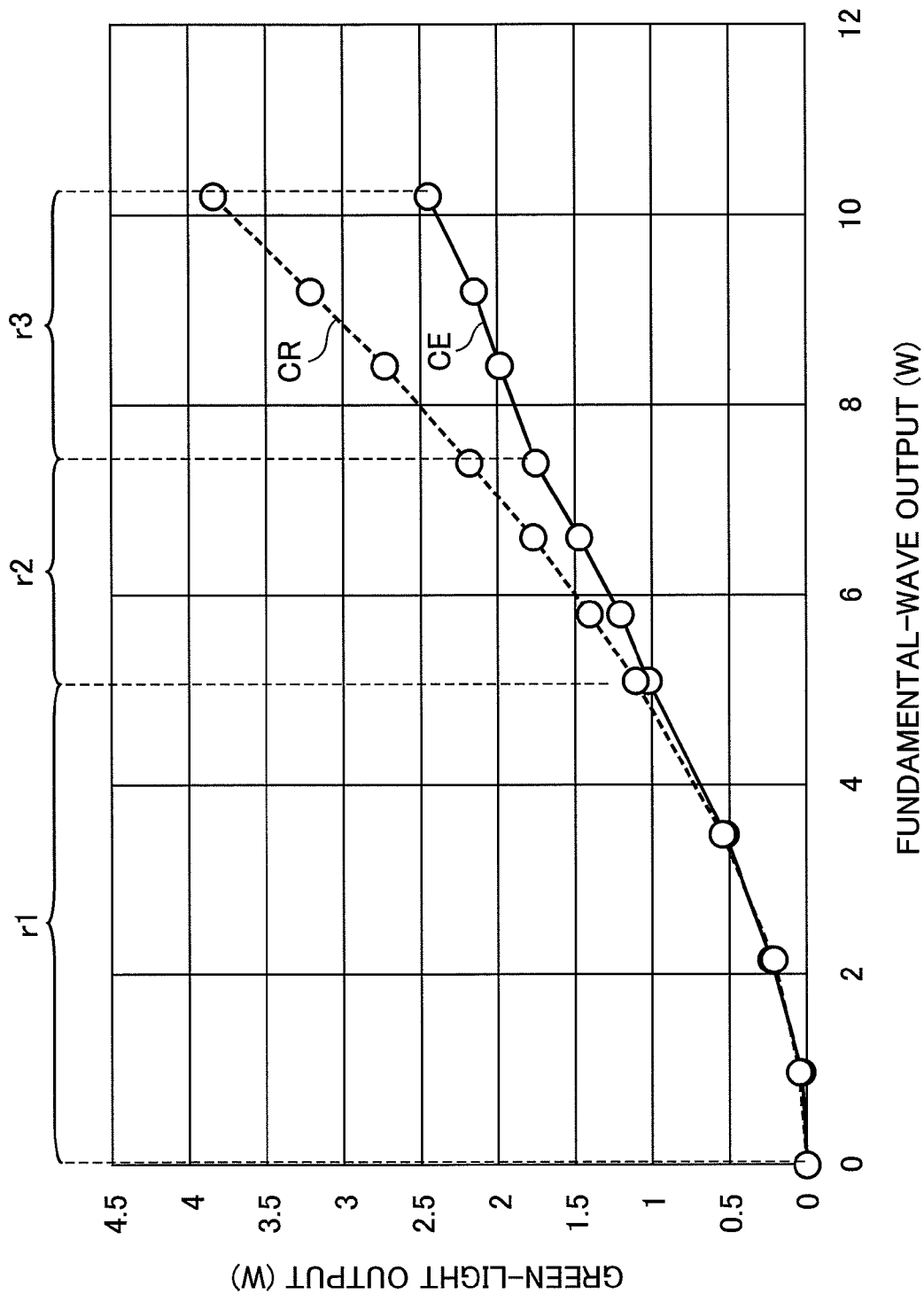
FIG. 26 is a graphical representation, showing a measurement value and a theoretical value of the input-output characteristic of a conventional wavelength conversion element formed by using an LiNbO$_3$ crystal including Mg added with 5.0 mol %.

Moreover, it is desirable that the higher harmonic wave emitted from the wavelength conversion element 27 be green light whose wavelength is 510 to 550 nm, and the output of the green light be 1 W or above. More desirably, it should be 1.5 W or above. In this case, as shown in FIG. 26, even if the ultraviolet induced green-light absorption reduces the green light's output, the green light's output after the wavelength conversion can be increased up to a high class-W output without a fall in the output because of such ultraviolet induced green-light absorption.

The higher harmonic wave emitted from the wavelength conversion element 27 may also be blue light which has a wavelength of 440 to 490 nm. It is desirable that the output of the blue light be 0.1 W or above. More desirably, it should be 0.15 W or above. In this case, even if the ultraviolet induced green-light absorption reduces the blue light's output, the blue light's output after the wavelength conversion can be increased up to a high output without a fall in the output because of such ultraviolet induced green-light absorption. In these respects, the other embodiments are also the same.

Second Embodiment

Figure 2:
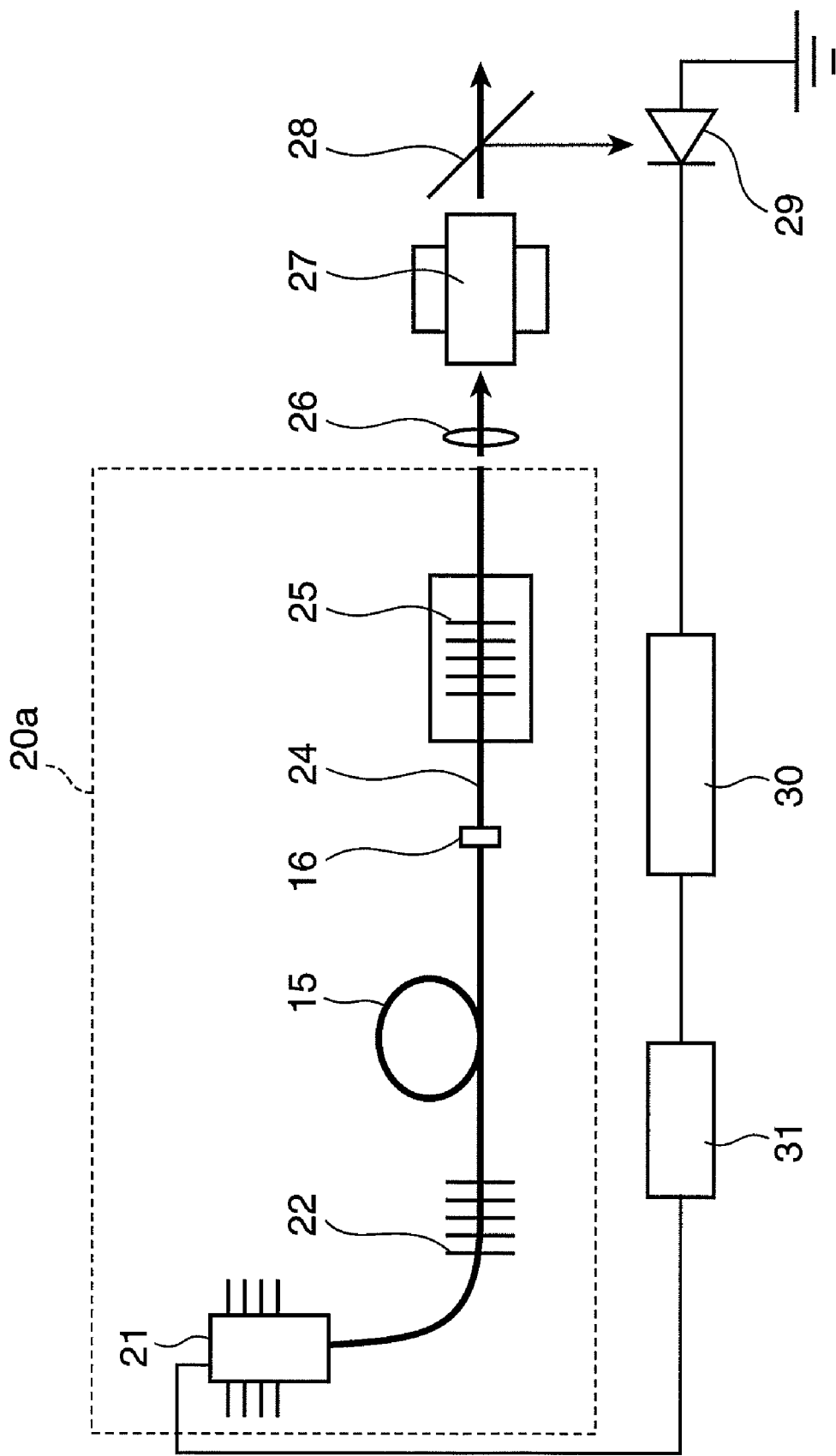
FIG. 2 is a block diagram, showing a schematic configuration of a wavelength converter according to a second embodiment of the present invention.

FIG. 2 is a block diagram, showing a schematic configuration of a wavelength converter according to a second embodiment of the present invention. In the above described fiber laser 20, as shown in FIG. 1, the pair of fiber grating 22 and fiber grating 25 are formed inside of the fiber 14. In contrast, in this embodiment, as shown in FIG. 2, a fiber (i.e., an optical fiber) 15 formed with the fiber grating 22 in a part thereof is optically connected via a connection portion 16 to a fiber (i.e., an optical fiber) 24 formed with the fiber grating 25 in a part thereof connect optically. They are united to form a fiber laser 20a. Thereby, in the fiber laser 20a, the fiber 15 which converts pumping light efficiently into a fundamental wave and the fiber 24 which efficiently heats the fiber grating 25 that selects a wavelength of the fundamental wave can be created so as to have an optimum configuration, respectively. Hence, they can be used as an integrated fiber.

Specifically, the core part of the fiber 15 is doped with the rare earth element Yb as the laser active substance at a concentration of 10000 ppm. The core part and clad part of the fiber 24 are doped with the rare earth element Yb at a concentration of 20000 to 30000 ppm for heating the fiber grating 25. Compared with the fiber 14 of FIG. 1, in the fiber 15 which converts the pumping light into the fundamental wave, its clad part is not doped with any rare earth element. Hence, leakage light of the fundamental wave or the pumping light is not absorbed in the clad part. Therefore, the loss of light caused through the absorption becomes small, and in this state, the pumping light can be efficiently converted into the fundamental wave. Besides, in the fiber 24, its doping concentration of the rare earth element Yb in the core part becomes twice to three times as high as that of the fiber 14. This makes it possible to heat the fiber grating 25 more efficiently.

Third Embodiment

Figure 3:
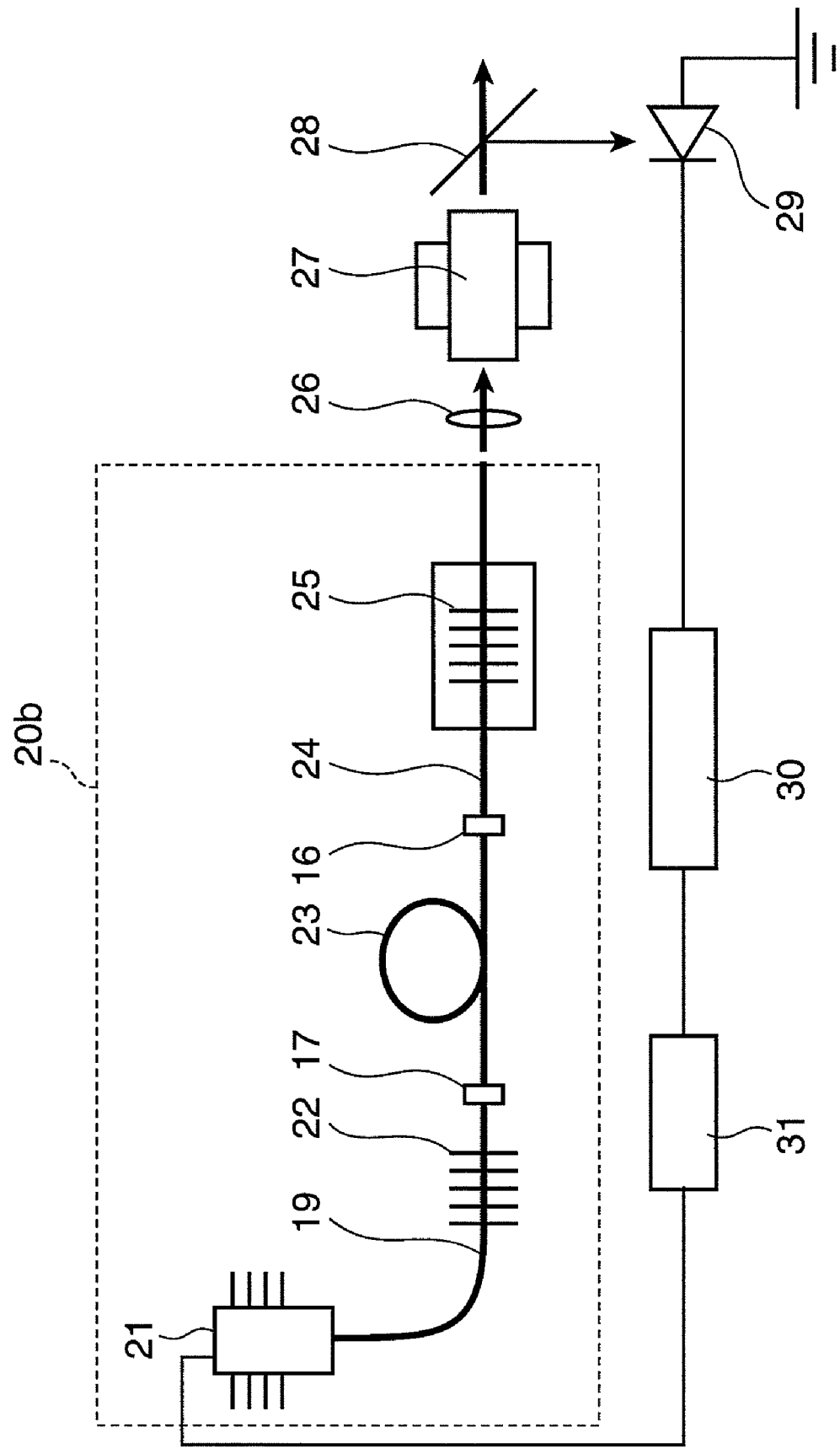
FIG. 3 is a block diagram, showing a schematic configuration of a wavelength converter according to a third embodiment of the present invention.

FIG. 3 is a block diagram, showing a schematic configuration of a wavelength converter according to a third embodiment of the present invention. In this embodiment, as shown in FIG. 3, a fiber (i.e., an optical fiber) 19 formed with the fiber grating 22 in a part thereof, a fiber (i.e., an optical fiber) 23 including a laser active substance and the fiber (i.e., an optical fiber) 24 formed with the fiber grating 25 in a part thereof connect optically via the connection portion 16 and a connection portion 17. They are united to form a fiber laser 20b. Thereby, in the fiber laser 20b, the fiber 23 which converts pumping light efficiently into a fundamental wave and the fiber 24 which efficiently heats the fiber grating 25 that selects a wavelength of the fundamental wave can be created so as to have an optimum configuration, respectively. Hence, they can be used as an integrated fiber. Besides, the fiber 19 is not doped with any rare earth element, so that little light-absorption loss is caused.

For example, the core part of the fiber 23 is doped with the rare earth element Yb as the laser active substance at a concentration of 10000 ppm. The core part and clad part of the fiber 24 are doped with the rare earth element Yb at a concentration of 20000 to 30000 ppm for heating the fiber grating 25. Compared with the fiber grating 25, if the fiber grating 22 does not have a great wavelength selectivity, there is no need to dope the fiber 19 with any rare earth element. Hence, it is not supposed to be doped with any rare earth element.

According to the above described configuration of the fiber laser 20b in FIG. 3, the same advantages as the configuration of the fiber laser 20a of FIG. 2 can be obtained relative to the fiber laser 20 of FIG. 1. Specifically, compared with the fiber 14 of FIG. 1, the fiber 23 which converts the pumping light into the fundamental wave, its clad part is not doped with any rare earth element. Hence, leakage light of the fundamental wave or the pumping light is not absorbed in the clad part. Therefore, the loss of light caused through the absorption becomes small, and in this state, the pumping light can be efficiently converted into the fundamental wave. Besides, in the fiber 24, its doping concentration of the rare earth element Yb in the core part becomes twice to three times as high as that of the fiber 14. This makes it possible to heat the fiber grating 25 more efficiently. Besides, the fiber 19 is not doped with any rare earth element, so that no loss is caused like producing heat by absorbing a part of the fundamental wave or the pumping light.

In addition, in this embodiment, the fiber-doping rare earth element may also be varied as described below. In the fiber 23, its core part is doped with the rare earth element Yb as the laser active substance at a concentration of 10000 ppm. In the fiber laser 20b, the reflection wavelength bands of the fiber grating 22 and the fiber grating 25 as its laser resonator's pair of reflection mirrors are set to have a width of 1 nm and 0.1 nm, respectively, so that the selectivity of a wavelength becomes great in the fiber grating 25. There is no need to heat the fiber grating 22, and thus, the fiber 19 including the fiber grating 22 is not doped with any rare earth element. The fiber 24 which effectively heats the fiber grating 25 that selects the fundamental wave's wavelength is doped so as to absorb a part of the fundamental wave or the pumping light. Specifically, as the rare earth element for doping the core part and clad part of the fiber 24, Nd is used and its addition concentration is set to 1000 to 3000 ppm.

Figure 4:
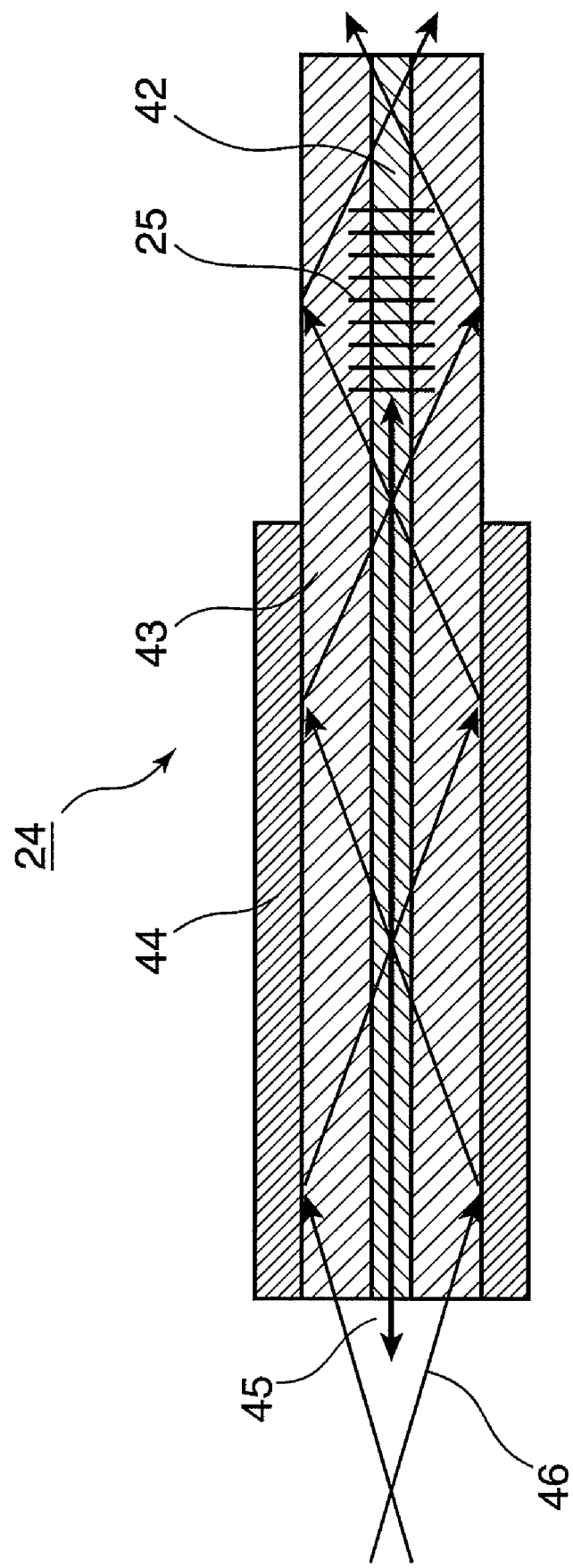
FIG. 4 is a schematic enlarged sectional view of a fiber and a fiber grating shown in FIG. 3, cut off along the optical axis near the fiber grating, showing their structure.

FIG. 4 is a schematic enlarged sectional view of the fiber 24 and the fiber grating 25 of FIG. 3, cut off along the optical axis near the fiber grating 25, showing their structure.

A core part 42 and a clad part 43 of the fiber 24 are doped with the rare earth element Nd at a concentration of 1000 to 3000 ppm. If they are doped with this rare earth element, a level is formed at which the fundamental wave or the pumping light is absorbed. The peripheral surface of the clad part 43 of the fiber 24 is covered with a coating part 44. A laser beam oscillated by the laser active substance of the fiber 23 as the wavelength converter's fundamental wave propagates on the fiber 24 as well. In FIG. 4, a fundamental wave 45 and pumping light 46 which propagate on the fiber 24 are partly absorbed according to the level formed with the rare earth element. Then, they turn into heat. Particularly, with heat produced near the fiber grating 25, the fiber grating 25 is directly heated, and thus, its temperature rises. As the temperature rises, the core part 42 formed with the fiber grating 25 expands thermally and the grating interval becomes wider. Consequently, the fundamental-wave wavelength shifts to the long-wavelength side.

In the configuration of an ordinary fiber amplifier or fiber laser, there is no necessity to heat the fiber grating 25. Hence, for the purpose of heating it, the fiber's core part or clad part is not doped with any rare earth element. In this embodiment, they are doped with the rare earth element for heating the fiber grating 25, so that the heating raises the temperature significantly. Therefore, compared with the configuration of an ordinary fiber laser or the like, the fundamental-wave wavelength shifts largely toward the long-wavelength side. If this internal heating effect produced by the doping of the rare earth element is used, then a green laser beam with a high output of several watts or above can be obtained from the wavelength converter. The reason for this will be described below.

In the configuration of an ordinary fiber laser as it is, if the fundamental wave exceeds 5 to 10 W, then the shift length in the wavelength of the fundamental wave goes far apart from the shift length in the phase matching wavelength in accordance with the temperature rise. However, if the internal heating effect by the rare earth element's doping is used, the temperature rise of fiber grating 25 becomes several times to one digit as much as in the case of such an ordinary configuration. Thereby, the shift length in the wavelength of the fundamental wave in the fiber grating 25 can be substantially matched to the shift length in the phase matching wavelength in the wavelength conversion element 27.

As a result, using a temperature control unit such as a Peltier element attached to the wavelength conversion element 27, the temperature is finely adjusted so that the shift length in the fundamental-wave wavelength can be matched to the shift length in the phase matching wavelength. This makes it possible to stably obtain a green laser beam having a high output of several watts or above.

Furthermore, in order to enhance the conversion efficiency of the wavelength conversion element 27, it is desirable that the output of the fundamental wave incident upon the wavelength conversion element 27 be linear polarized light. In this embodiment, all the fiber 19, the fiber 23 and the fiber 24 are a polarization maintaining-type fiber, and thus, the output of the fundamental wave incident upon the wavelength conversion element 27 from the fiber laser 20*b* is in the form of linear polarized light. Incidentally, any one of the fiber 19, the fiber 23 and the fiber 24 may be not a polarization maintaining-type fiber but an ordinary fiber, and the fundamental-wave output can also be linear polarized light by inserting a polarizer into the fiber laser 20*b*.

Figure 5:
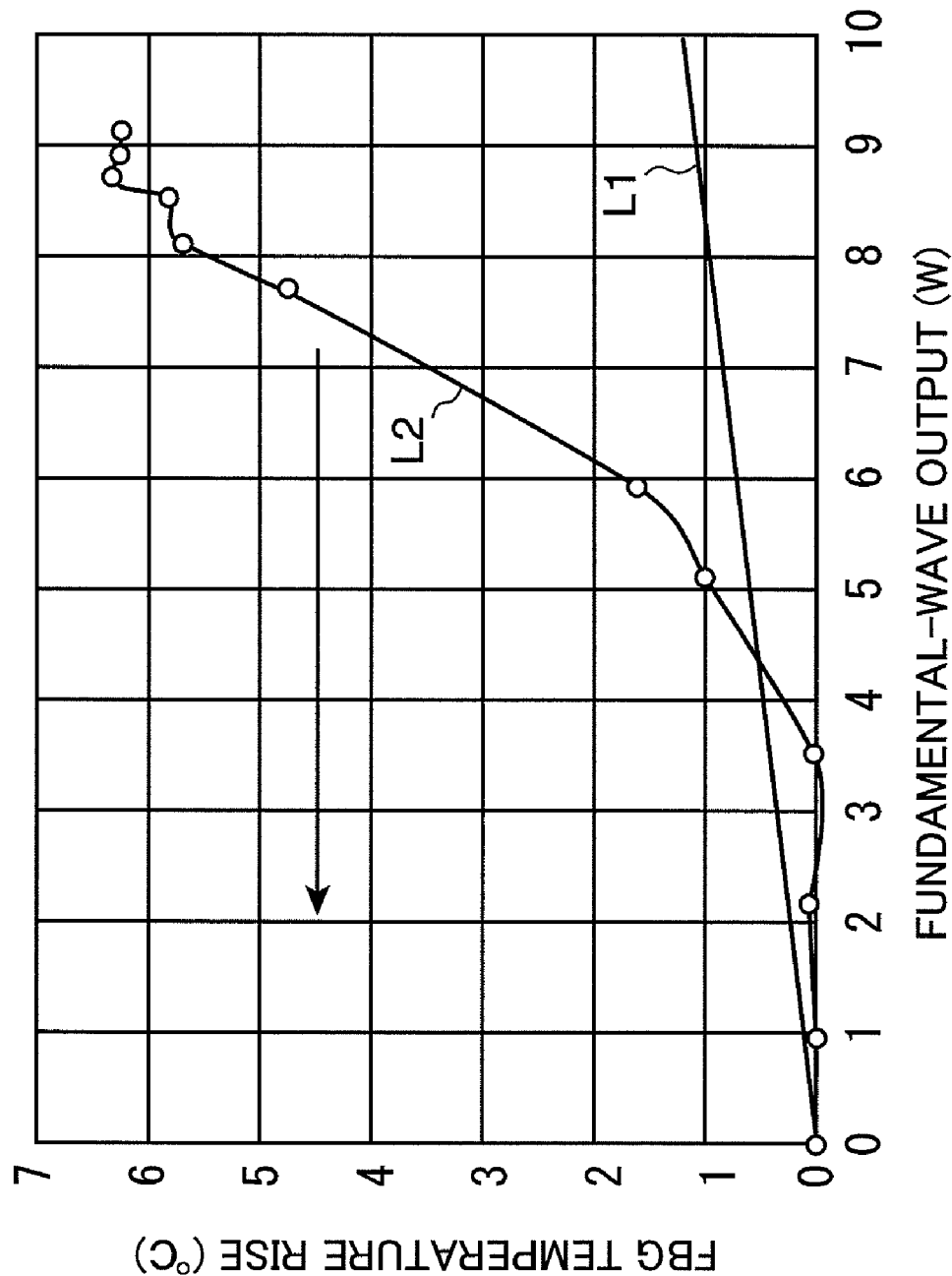
FIG. 5 is a graphical representation, showing a measurement result of a rise in the temperature of an ordinary fiber grating and a rise in the temperature of a fiber grating according to the third embodiment in accordance with the output of a fundamental wave.

FIG. 5 shows a measurement result of a rise L1 in the temperature of an ordinary fiber grating and a rise L2 in the temperature of the fiber grating 25 according to this embodiment in accordance with the output of the fundamental wave. The temperature rise L1 of the ordinary fiber grating increases in proportion to the fundamental-wave output. On the other hand, in this embodiment, until the fundamental-wave output becomes 4 W or so, the temperature rise L2 of the fiber grating 25 proportionally increases with a slightly gentler inclination than the ordinary one. If the fundamental-wave output exceeds approximately 4.5 W, the temperature rise L2 increases sharply as the fundamental-wave output heightens. This would be because if the fundamental-wave output exceeds approximately 4.5 W, the fiber-doping effect with the rare earth element can be conspicuously obtained. This effect becomes clear, especially, when the core part of the fiber 24 is doped with the rare earth element Nd at a concentration of 1000 to 3000 ppm.

Figure 6:
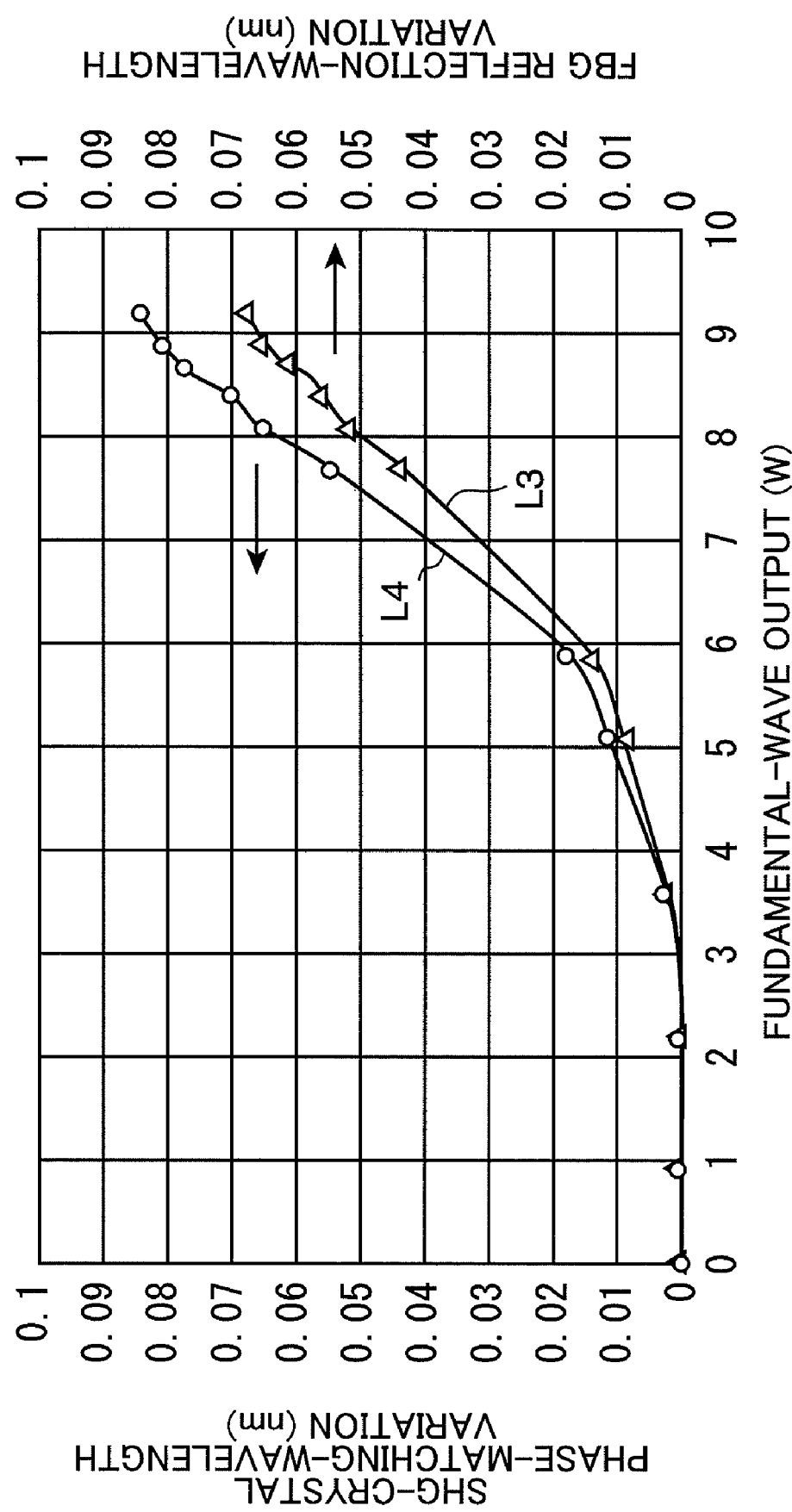
FIG. 6 is a graphical representation, showing a measurement result of a variation in reflection wavelength in a fiber grating and a variation in phase matching wavelength in a wavelength conversion element in accordance with the output of a fundamental wave according to the third embodiment.

FIG. 6 shows a measurement result of a variation L3 in reflection wavelength in the fiber grating 25 and a variation L4 in phase matching wavelength in the wavelength conversion element 27 in accordance with the output of the fundamental wave. A graph of FIG. 6 indicates that the temperature rise of the fiber grating 25 according to the fundamental-wave output in FIG. 5 reflects the reflection-wavelength variation. Hence, the temperature rise L2 of the fiber grating 25 shown in FIG. 5 and the reflection-wavelength variation L3 of the fiber grating 25 shown in FIG. 6 express a similar change to each other according to the fundamental-wave output.

Besides, the phase-matching wavelength variation L4 of the wavelength conversion element 27 according to the fundamental-wave output also expresses a variation tendency similar to the reflection-wavelength variation L3 of the fiber grating 25, though the former has a slightly greater value than the latter. In short, in this embodiment, it can be seen from FIG. 6 that the shift length in the wavelength of the fundamental wave in the fiber grating 25 is substantially matched to the shift length in the phase matching wavelength in the wavelength conversion element 27. Thereby, using the Peltier element attached to the wavelength conversion element 27, the temperature is finely adjusted so that the shift length in the fundamental-wave wavelength can be matched to the shift length in the phase matching wavelength. This makes it possible to stably obtain a green laser beam having a high output of several watts or above. In this embodiment, when the fundamental-wave output is 9 W, a 2.3-W green laser beam can be stably obtained.

Figure 7:
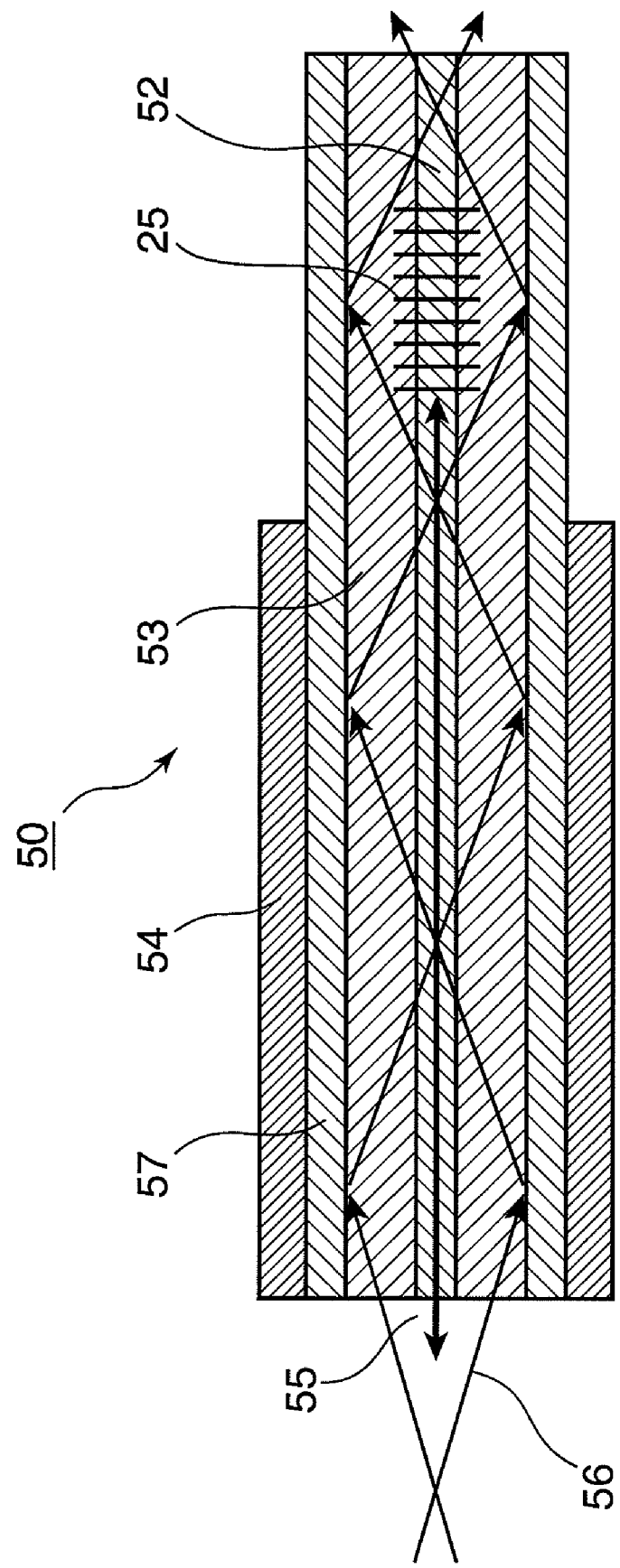
FIG. 7 is a schematic enlarged sectional view of a double-clad structure fiber and a fiber grating, cut off along the optical axis near the fiber grating, showing their structure.

In each embodiment described above, as the fibers, the ones with a single clad part are used, but fibers having a double-clad structure may also be used. FIG. 7 is a schematic enlarged sectional view of a double-clad structure fiber 50 and the fiber grating 25, cut off along the optical axis near the fiber grating 25, showing their structure. In the double-clad structure fiber 50, in terms of two clad parts 53 and 57, the internal clad part 53 has a higher refractive index than the external clad part 57. According to this property or such another, pumping light 56 can be more efficiently kept inside of the internal clad part 53 and propagated on the fiber 50. The peripheral surface of the external clad part 57 is covered with a coating part 54.

Moreover, apart of a fundamental wave 55 or the pumping light 56 which propagates in a core part 52 is absorbed to heat the fiber grating 25. Taking this into account, in the same way as the above described structure, at least either of the internal clad part 53 and the external clad part 57 of this double-clad structure fiber 50 may also be doped with a rare earth element. According to this configuration, the shift length in the wavelength of the fundamental wave 55 can be matched to the shift length in the phase matching wavelength of the wavelength conversion element 27. This helps stably obtain a green laser beam with a high output of several watts or above.

In addition, the fiber 19, the fiber 23 and the fiber 24 may also be created as a single continuous fiber in the same way as the fiber 14 of FIG. 1. In the case where this clad part of the fiber 14 is not doped with a rare earth element and only its core part is doped with a rare earth element, if the doping with at least one element of the rare earth elements of Nd, Er, Dy, Pr, Tb and Eu is given below 1000 ppm, the heating effect on the fiber grating 25 can be slightly reduced. When the doping is given with at least one element of these rare earth elements, in order to enhance the heating effect on the fiber grating 25, desirably, the doping should be given within a range of 1000 to 3000 ppm. In this case, such a prominent heating effect as shown in FIG. 6 of this embodiment can be obtained.

By the way, if the quantity of a rare earth element given a fiber for doping falls below its lower limit, then the quantity of light to be absorbed lessens and the heating effect on a fiber grating declines. In contrast, if the quantity of the rare earth element given the fiber for doping exceeds its upper limit, then the fiber grating is overheated and the internal temperature becomes unstable. This makes it impossible to control the visible-light output of the wavelength converter.

Fourth Embodiment

Figure 8:
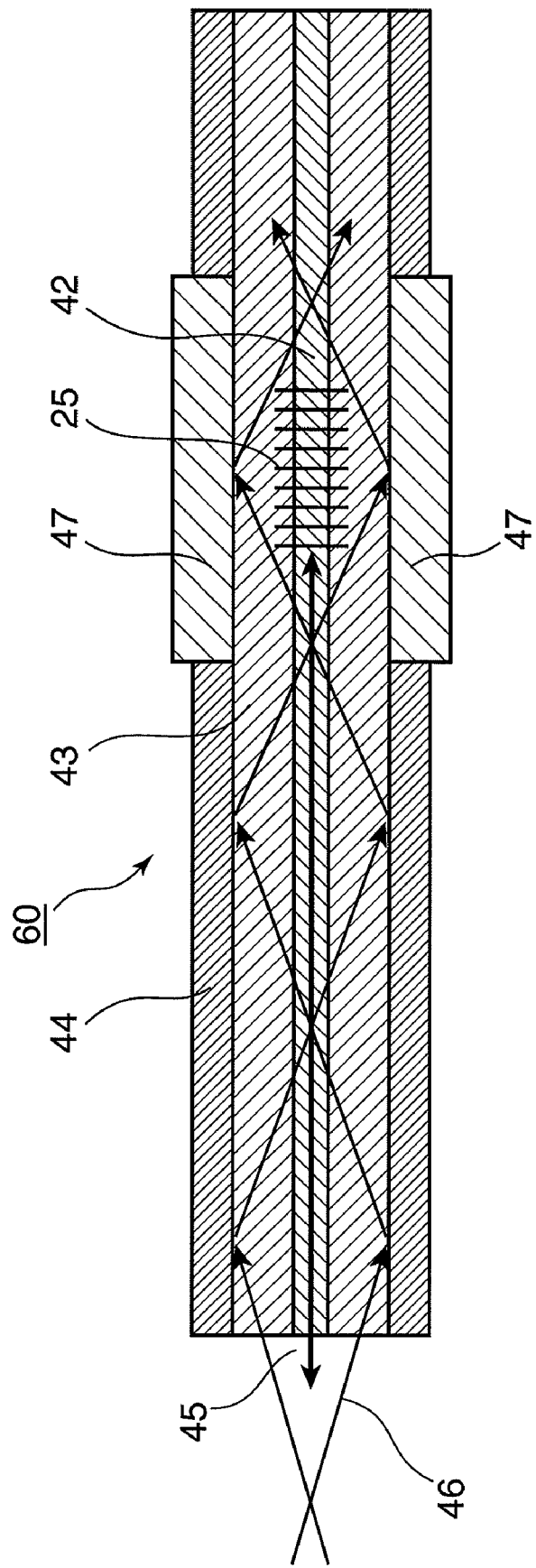
FIG. 8 is a schematic enlarged sectional view of a fiber and a fiber grating used in a wavelength converter according to a fourth embodiment of the present invention, cut off along the optical axis near the fiber grating, showing their structure.

FIG. 8 is a schematic enlarged sectional view of a fiber and a fiber grating used in a wavelength converter according to a fourth embodiment of the present invention, cut off along the optical axis near the fiber grating, showing their structure. A fiber 60 of FIG. 8 is formed by covering the fiber 24 of FIG. 4 according to the third embodiment with a re-coating part 47 on the outside of the clad part 43 in the area where the fiber grating 25 is formed. The other configurations according to this embodiment are the same as those according to the third embodiment, and thus, their detailed description is omitted. Principally, its featured part will be described.

The re-coating part 47 is made of a material which absorbs a part of the output of the fundamental wave 45 or the pumping light 46. In this embodiment, the re-coating part 47 is formed by applying a mixture of a fluorocarbon polymer and an optical absorber having a particle diameter of several micron meters to the periphery of the clad part 43 in the fiber 60 of FIG. 8. Preferably, the optical absorber should be a bubble of air or the like, carbon, a rare-earth oxide, or the like. This is mixed into a fluorocarbon polymer so that it occupies approximately one to five volume-percent. In this case, a part of the light reflected by the fiber grating 25 of the fundamental wave 45 or the pumping light 46 is absorbed into the re-coating part 47. The re-coating part 47 works as the heating portion, and thus, the fiber grating 25 is heated. This raises the temperature of the fiber grating 25 and widens its grating interval, so that the fundamental-wave wavelength shifts to the long-wavelength side.

At this time, simultaneously, the clad part 43 of the fiber 60 is doped with the rare earth element of Er at 1000 to 3000 ppm. In addition to the heating effect at the re-coating part 47, it is confirmed that a part of the output of the fundamental wave 45 or the pumping light 46 is absorbed at the clad part 43 to produce a heating effect on the fiber grating 25.

Figure 9:
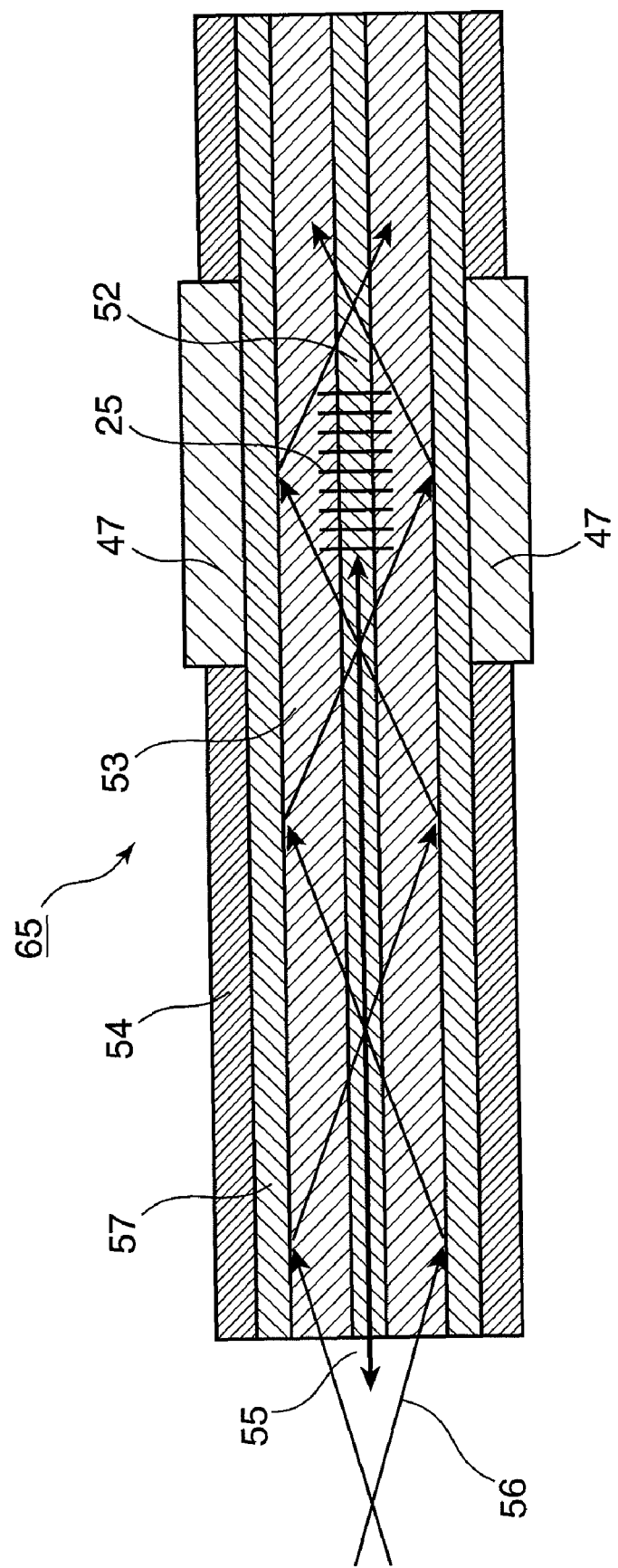
FIG. 9 is a schematic enlarged sectional view of another fiber and the fiber grating used in the wavelength converter according to the fourth embodiment of the present invention, cut off along the optical axis near the fiber grating, showing their structure.

FIG. 9 is a schematic enlarged sectional view of another fiber and the fiber grating used in the wavelength converter according to the fourth embodiment of the present invention, cut off along the optical axis near the fiber grating, showing their structure. As shown in FIG. 9, such a double-clad structure fiber as shown in FIG. 7 is used. The periphery of the external clad part 57 located in the area where the fiber grating 25 is formed may also be covered with the re-coating part 47. In the fiber 65 of FIG. 9, the internal clad part 53 is doped with the rare earth element Er at 1000 to 3000 ppm, and further, the re-coating part 47 is formed on the periphery of the external clad part 57 near the fiber grating 25.

In this case, in the same way as the fiber 60 of FIG. 8, in addition to the heating effect at the re-coating part 47, it is confirmed that apart of the output of the fundamental wave 55 or the pumping light 56 is absorbed at the clad part 53 to produce a heating effect on the fiber grating 25.

The re-coating part 47 of FIG. 8 and FIG. 9 absorbs light and produces heat, but is made of an incombustible material. Hence, as the material of the fibers 60 and 65, a sufficiently safe material is selected, thereby helping ensure a high reliability.

Besides, as the material of the re-coating part 47, it is preferable that a material be used which has a refractive index within a range of 1.37 to 1.43. For example, preferably, a material should be used which is formed by adding a pigment or an air bubble to the base of a fluorocarbon polymer. Thereby, it has a higher refractive index than the refractive index 1.35 to 1.36 of an ordinary coating material, so that a part of the reflected light of a fundamental wave or pumping light can be more easily absorbed. In other words, a part of the fundamental wave's reflected light or the pumping light can be absorbed by an optimal quantity to heat the fiber grating 25. On the other hand, if the refractive index goes beyond 1.43, that is undesirable because the fiber 60 or the fiber 65 absorbs the pumping light excessively to overheat it, or the loss of the pumping light becomes too great.

Incidentally, in the above described first to fourth embodiment, Nd and Er are used for the core part of the fiber 24 or the like. However, the core part may be doped with at least one rare earth element chosen from among Nd, Er, Dy, Pr, Tb and Eu at a concentration of 1000 to 3000 ppm. Or, it may also be doped with at least one rare earth element chosen from among Yb, Ce, Tm, Ho, Gd, Y and La at a concentration of 20000 to 30000 ppm. According to such a configuration, the same advantage can be obtained.

Furthermore, in the above described first to fourth embodiment, Nd and Er are used for the clad part of the fiber 24 or the like. However, the clad part of the fiber 24 may be doped with at least one element chosen from among the rare earth elements of Nd, Er, Dy, Pr, Tb and Eu at a rate of 1000 to 3000 ppm. Or, it may also be doped with at least one element chosen from among the rare earth elements of Yb, Ce, Tm, Ho, Gd, Y and La at a rate of 20000 to 30000 ppm. According to such a structure, the heating effect becomes greater.

If the quantity of the above described rare earth element given a fiber for doping falls below its lower limit, then the fiber grating 25 cannot be effectively heated. In contrast, if the quantity of the rare earth element given the fiber for doping exceeds its upper limit, then the fiber grating is overheated and the temperature becomes unstable. This makes it impossible to control the visible-light output of the wavelength converter.

Moreover, as the rare earth element given the core part or clad part of the fiber 24 or the like for doping, even if a plurality of elements are combined, the same advantage as this embodiment can be obtained. In addition, if two or more kinds of rare earth elements are simultaneously used for doping, then a level other than the level formed with a single element is formed. Besides, if a level is formed so that the energy gap between these levels becomes 1.0 eV or below, this inter-level transition of 1.0 eV or below turns into thermal energy. This makes it possible to increase the heating effect on the fiber grating 25.

Fifth Embodiment

Figure 10:
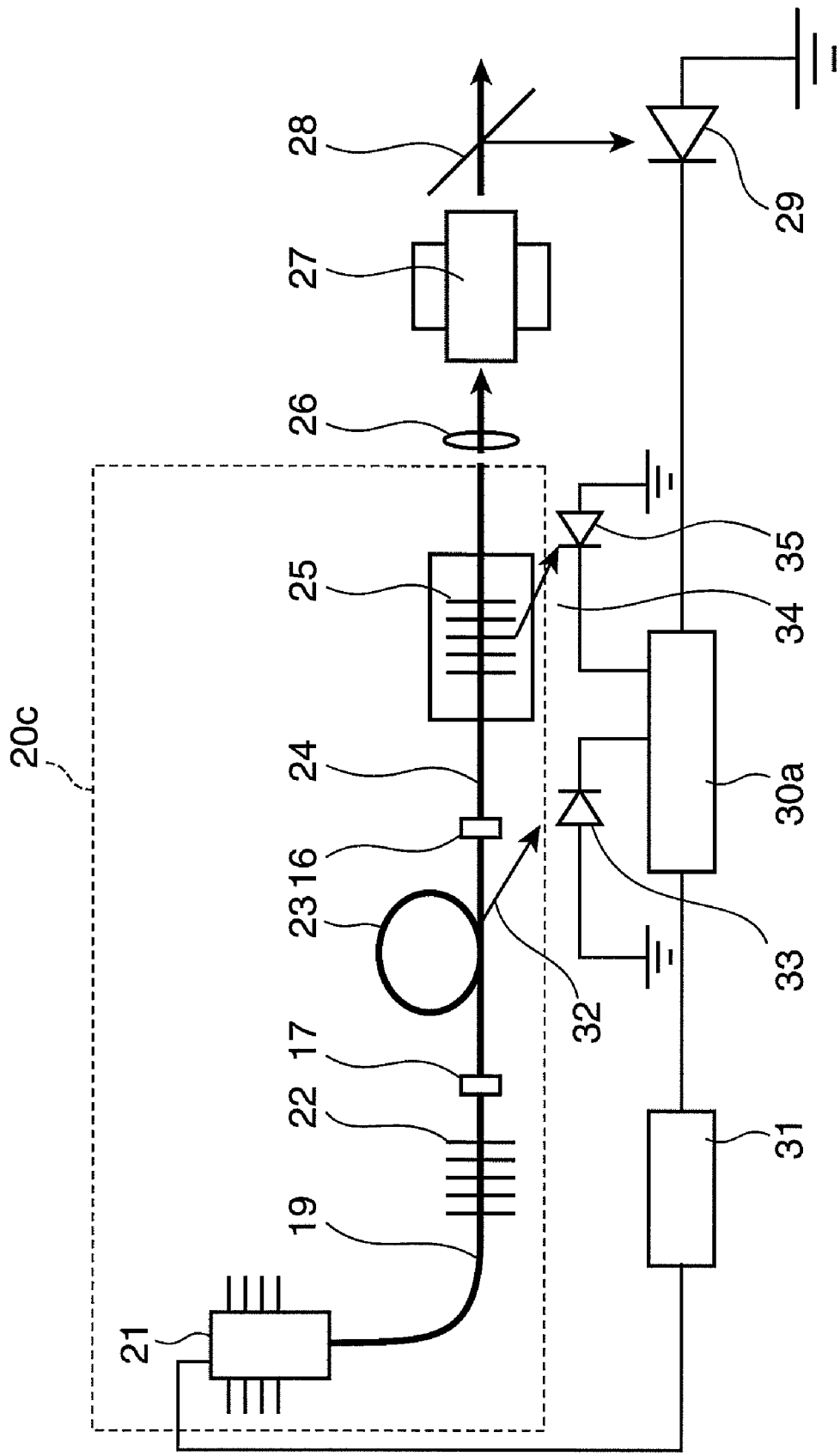
FIG. 10 is a block diagram, showing a schematic configuration of a wavelength converter according to a fifth embodiment of the present invention.
Figure 11:
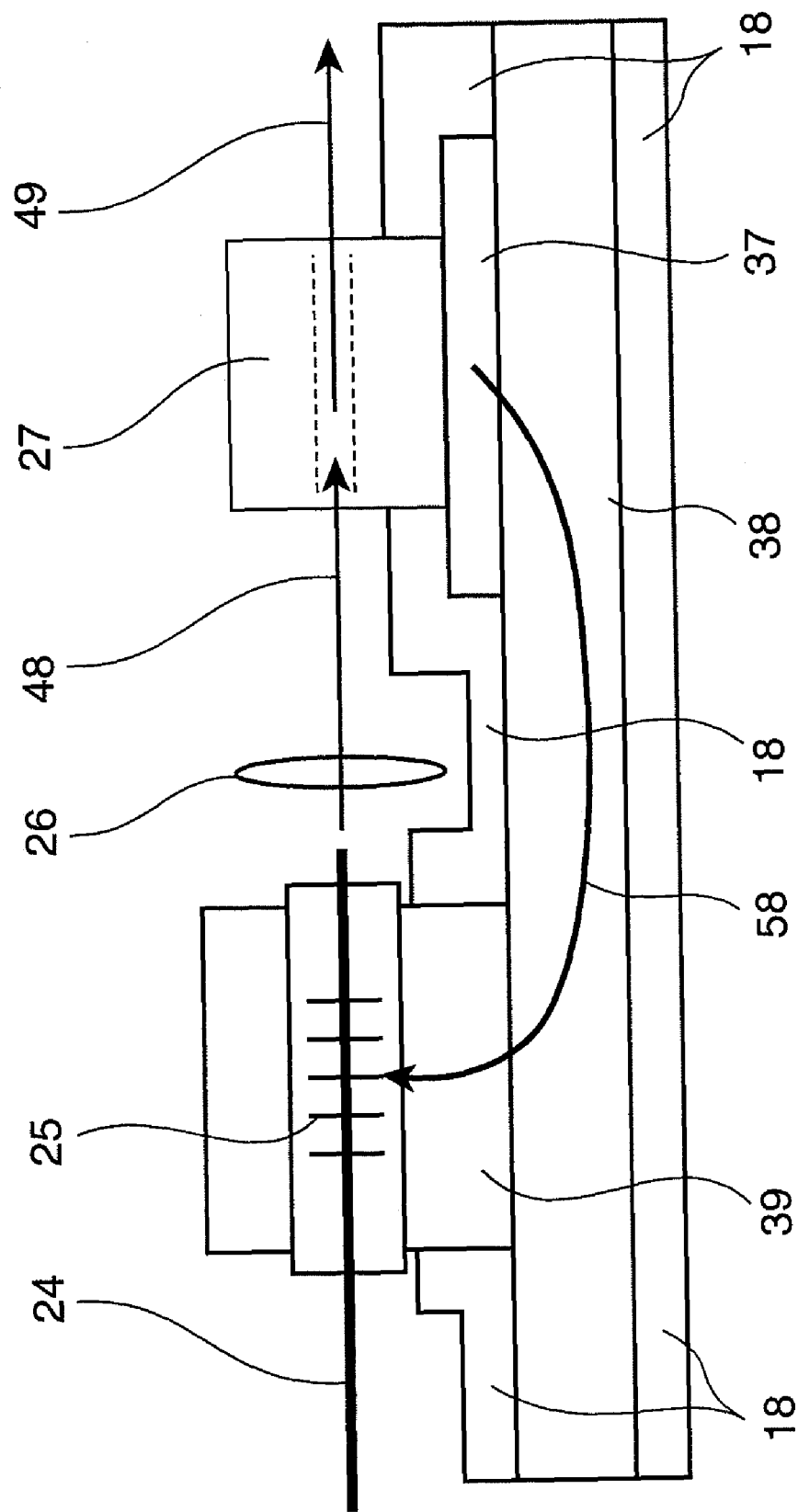
FIG. 11 is a schematic enlarged view of a fiber grating, a wavelength conversion element and their vicinities of the wavelength converter shown in FIG. 10.

FIG. 10 is a block diagram, showing a schematic configuration of a wavelength converter according to a fifth embodiment of the present invention. FIG. 11 is a schematic enlarged view of the fiber grating 25, the wavelength conversion element 27 and their vicinities of the wavelength converter shown in FIG. 10. The wavelength converter according to the fifth embodiment shown in FIG. 10 includes, as its basic structure: the wavelength conversion element 27; and a fiber laser 20c which outputs a laser beam corresponding to the output of a fundamental wave to be inputted in the wavelength conversion element 27. In addition to the configuration of FIG. 3, the fiber laser 20c detects a part of the fundamental-wave output, so that the intensity of a light output after the wavelength has been converted can be more precisely controlled. This configuration facilitates a more stable APC operation.

Specifically, as the fundamental-wave output, a part 32 of the fundamental-wave output taken out of the fiber 23 by a coupler or the like is detected by a photo-detector and taken into an output controller 30a. Or, as the fundamental-wave output, the light reflected by the fiber grating 25 is taken out and becomes a part 34 of the fundamental-wave output. Then, the part 34 of the fundamental-wave output is detected by a photo-detector 35 and taken into the output controller 30a. As this method of detecting the fundamental-wave output, either of the parts 32 and 34 of the fundamental-wave output may be detected, so long as a corresponding one of the photo-detectors 33 and 35 is used, respectively.

Furthermore, in this embodiment, in addition to the configuration according to the third embodiment, provided is a means for restraining the temperature of the wavelength conversion element 27 from rising. This helps keep less the variation in phase matching wavelength at the wavelength conversion element 27. Even if the wavelength converter conducts a high class-W output operation, the fundamental-wave output wavelength of the fiber laser 20c can be substantially matched stably and more easily to the phase matching wavelength.

As the means for restraining the temperature of the wavelength conversion element 27 from rising, as shown in FIG. 11, the wavelength conversion element 27 is cooled by a temperature control element. Herein, a Peltier element 37 is used as the temperature control element. In order to transfer, to the fiber grating 25, heat 58 which is produced at the Peltier element 37 by cooling the wavelength conversion element 27, a shared holding base 38 is used as a holder for the wavelength conversion element 27 and the fiber grating 25.

Besides, as shown in FIG. 11, so as not to diffuse the heat generated at the Peltier element 37 around, the shared holding base 38 or a holding block 39 for the fiber grating 25 is covered with a resin 18 as an insulator. Thereby, the heat 58 generated at the Peltier element 37 shown in FIG. 11 is efficiently transferred through the holding base 38 and the holding block 39 to the formation area of the fiber grating 25. Consequently, the fiber grating 25 can be effectively heated.

Next, a case will be described in which stable high-output light 49 is obtained from the wavelength conversion element 27 by increasing a fundamental-wave output 48 shown in FIG. 11 which is produced in the fiber 23 and the fiber 24 of FIG. 10. Compared with the time when a green laser operates at a low output of several hundred milli-watts, at the time of a high class-W output operation, the internal temperature of the wavelength conversion element 27 rises significantly. Compared with the low-output time, the phase matching wavelength also changes largely, and thus, it is difficult to match this to the wavelength of the fundamental-wave output 48 which is the incident wave. Therefore, as described in the third embodiment, the fiber 24 is doped with the rare earth element so that the temperature of the fiber grating 25 rises by approximately several times as much as the temperature rise of any conventional case. Thereby, the wavelength of the fundamental-wave output 48 wavelength shifts to the long-wavelength side and approaches the phase matching wavelength of the wavelength conversion element 27.

Moreover, in order to efficiently conduct the heat 58 of the Peltier element 37 generated by cooling the wavelength conversion element 27 up to the fiber grating 25, the holding base 38 is made of copper which is a thermal conductor. The whole surface of the holding base 38 is coated with the insulating resin 18 so that heat will not be diffused from the copper. In addition, in order to conduct the heat 58 efficiently to the fiber grating 25, the holding block 39 is also made of a brazen metal, or a material having a heat conductivity equivalent to a metal.

According to this configuration, when one tries to obtain the same high output in the wavelength converter, the heat 58 moves effectively to the fiber grating 25, so that the temperature of the wavelength conversion element 27 can be restrained from rising.

Sixth Embodiment

Figure 12:
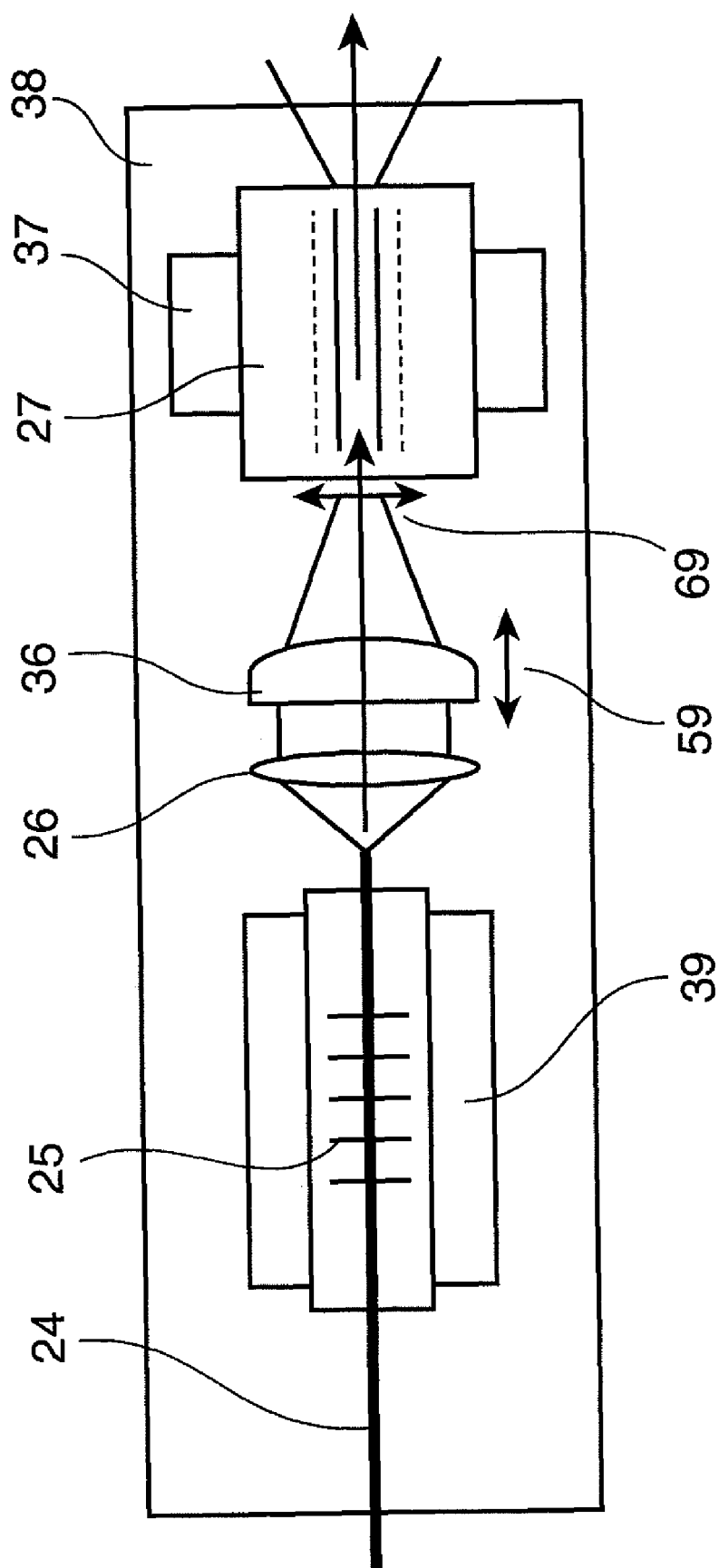
FIG. 12 is a schematic view of a fiber grating and a wavelength conversion element of a wavelength converter according to a sixth embodiment of the present invention, mainly showing the configuration of an optical system which joins them together.

FIG. 12 is a schematic view of a fiber grating and a wavelength conversion element of a wavelength converter according to a sixth embodiment of the present invention, mainly showing the configuration of an optical system which joins them together. The basic configuration according to this embodiment is the same as the one shown in FIG. 10. This is different from FIG. 10 in the part of an optical system which joins the light outputted by the fiber laser 20c to the wavelength conversion element 27. Specifically, in FIG. 10, such an optical system is only the lens 26, but in this embodiment, this optical system is configured by adding a cylindrical lens 36 as well as the lens 26. This helps restrain the internal temperature of the wavelength conversion element 27 from rising.

FIG. 12 shows the configuration in top view from the output part of the fiber laser 20c or the fiber grating 25 up to the wavelength converter's output part or the output side of the wavelength conversion element 27. As shown in FIG. 12, the fundamental wave of the fiber laser from the fiber grating 25 formed in the fiber 24 is incident through the lens 26 and the cylindrical lens 36 upon the wavelength conversion element 27. Through a non-linear optical effect at the wavelength conversion element 27, the incident fundamental wave is converted into a second harmonic wave of the fundamental wave. This second harmonic wave's output is the output light of the wavelength converter.

Herein, the cylindrical lens 36 can move in parallel directions 59 to the optical axis in accordance with the intensity of the fundamental-wave output. In response to this movement, an optical-beam width 69 is extended on the incidence plane of the fundamental-wave output in the wavelength conversion element 27. By the way, such a movement is made by attaching the cylindrical lens 36 to a piezoelectric element which moves in response to a signal that changes according to the level of the fundamental-wave output, a lens actuator in which electro-magnetic induction is used, or the like. Specifically, if the fundamental-wave output is low, the cylindrical lens 36 moves in the parallel directions 59 to the optical axis up to the position where the optical-beam width 69 on the end surface of the wavelength conversion element 27 comes to its minimum.

Next, in the same way as the wavelength converter shown in FIG. 10, a case is considered in which the part 32 of the fundamental-wave output or the part 34 of the fundamental-wave output is detected by the photo-detector or the photo-detector 35, and an increase in the fundamental-wave output is detected. In this case, according to the quantity of an increase in the fundamental-wave output, for example, the cylindrical lens 36 goes away little by little from the wavelength conversion element 27 in the parallel directions 59 to the optical axis. Thereby, the optical-beam width 69 becomes greater. In this way, inside of the wavelength conversion element 27, the intensity of an optical beam per unit volume is kept from being excessively great. This helps restrain the internal temperature of the wavelength conversion element 27 from rising.

Incidentally, in this case, the position of the cylindrical lens 36 position may also be changed by detecting the fundamental-wave output intensity and varying the voltage applied to a piezoelectric element in response to the intensity level. Besides, a plurality of such cylindrical lenses 36 can also be prepared which have a focal distance different from each other. Then, the plurality of cylindrical lenses 36 are each substituted and used in accordance with the fundamental-wave output-intensity level.

Seventh Embodiment

Figure 13:
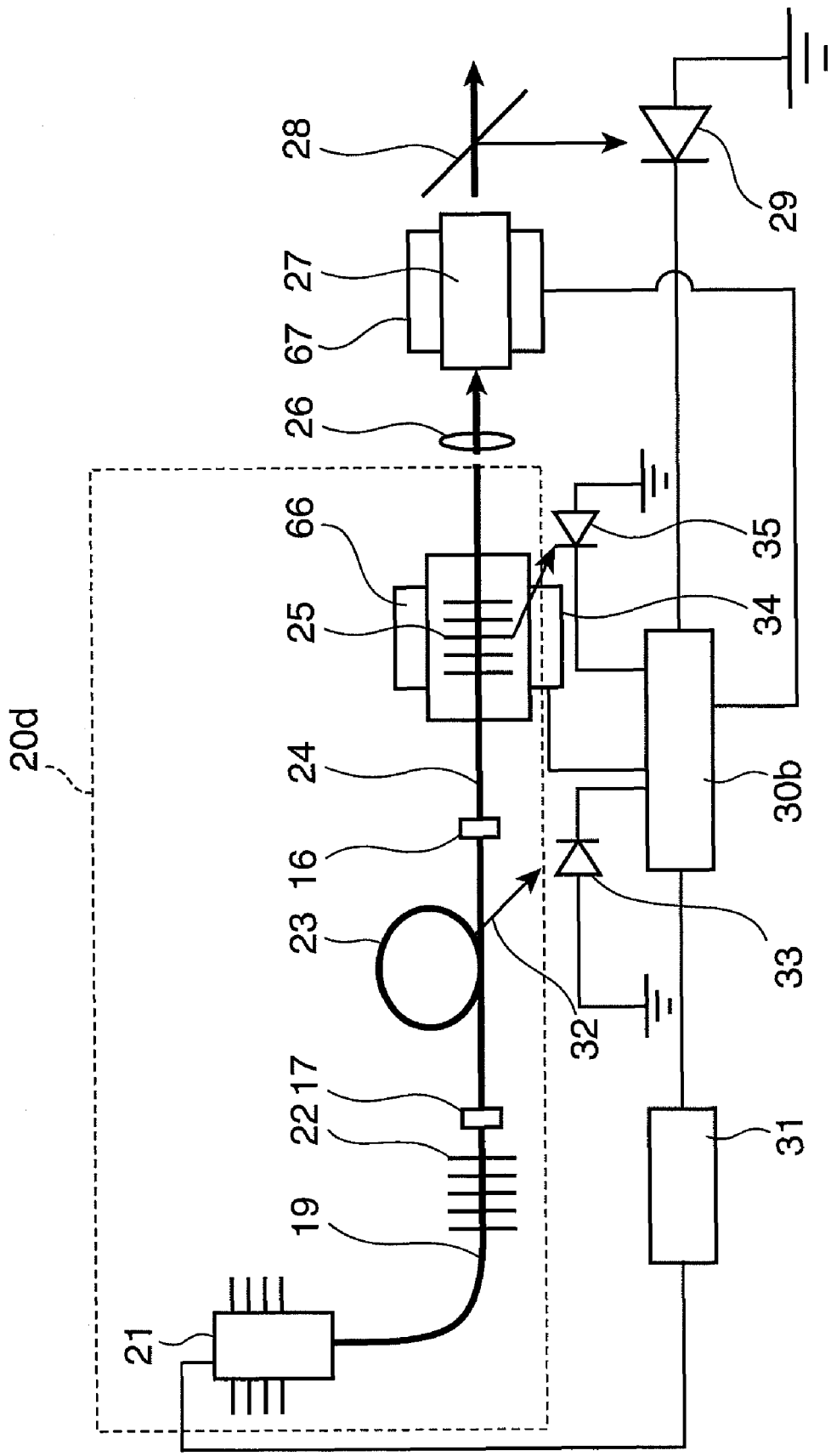
FIG. 13 is a block diagram, showing a schematic configuration of a wavelength converter according to a seventh embodiment of the present invention.

A wavelength converter according to a seventh embodiment of the present invention will be described with reference to FIG. 13. FIG. 13 is a block diagram, showing a schematic configuration of the wavelength converter according to the seventh embodiment of the present invention. The wavelength converter shown in FIG. 13 has substantially the same configuration as FIG. 10. It is different in the fact that the temperature of each of the fiber grating 25 of a fiber laser 20d and the wavelength conversion element 27 can be controlled by Peltier elements 66 and 67, respectively, as a temperature controlling means. In the entire wavelength converter including the Peltier elements 66 and 67, each operation is controlled by an output controller 30b.

In this embodiment, a part of the output of the wavelength converter is detected by the photo-detector 29 and the output of the fundamental wave 45 is detected by the photo-detectors 33 and 35. Using the wavelength converter's environment temperature as a parameter, data which expresses the relation between the fundamental-wave output and the wavelength converter's output and data on the length of a shift in the wavelength of the fundamental wave in accordance with the fundamental-wave output or the length of a shift in the phase matching wavelength are measured in advance. Such data is stored as a table in the output controller 30b. In order to maximize the conversion efficiency of the wavelength conversion element 27 based on the tabled data, under the control of the output controller 30b, the fiber grating 25 is heated by the Peltier element 66 or the wavelength conversion element 27 is cooled by the Peltier element 67. As a result, finally, the difference between the shift length in the fundamental-wave output wavelength and the shift length in the phase matching wavelength becomes zero, so that a stable high class-W output operation can be obtained.

Figure 14:
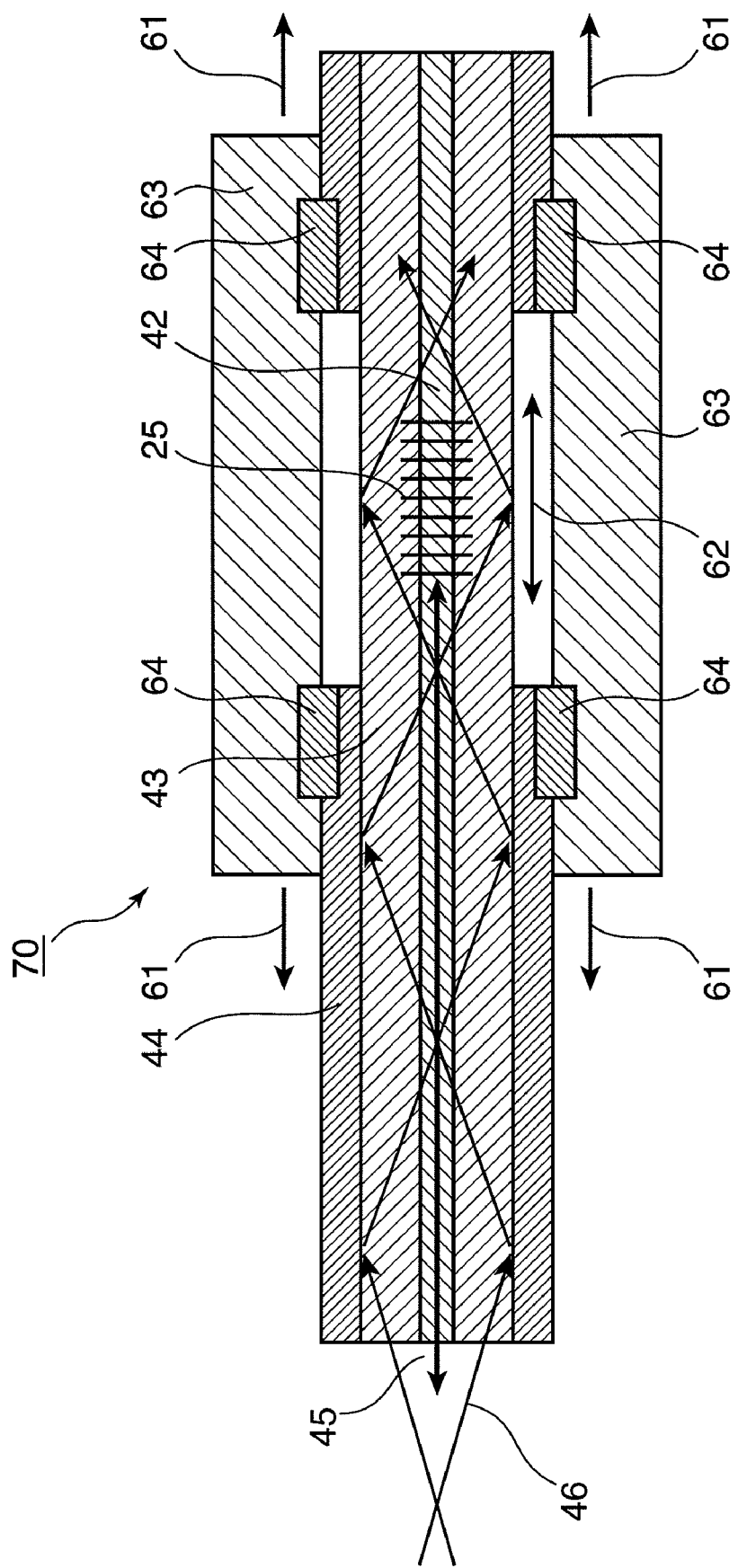
FIG. 14 is a schematic view of a fiber and a fiber grating used in the wavelength converter according to the seventh embodiment of the present invention, showing their detailed configuration near the fiber grating.

In addition, as the fiber 24 of FIG. 13, a fiber 70 shown in FIG. 14 can be used. FIG. 14 shows a detailed configuration near the area of the fiber grating 25 formed in the fiber 70. It shows the configuration of the fiber 70 in which the vicinity of the fiber grating 25 is held on a hold member 63. Using an adhesive 64, this hold member 63 is glued and fixed to the coating part 44 of the fiber 70.

The hold member 63 absorbs the leakage light of the light reflected by the fiber grating 25 of the fundamental wave 45 or the pumping light 46 and generates heat. Upon generating heat, the hold member 63 expands thermally to pull, via the adhesive 64, the coating part 44 of the fiber 70 in right-and-left directions 61 shown in FIG. 14. This is because the hold member 63 has a greater thermal-expansion coefficient than each thermal-expansion coefficient of the core part 42 and the clad part 43 of the fiber 70. Consequently, a tensile stress in external directions 62 is applied to the fiber grating 25. Thereby, its grating interval becomes wider, so that the wavelength of the fundamental wave 45 shifts to the long-wavelength side.

When one tries to obtain a class-W output in any conventional wavelength converter, particularly, the internal temperature of a wavelength conversion element rises significantly to cause a sharp variation in phase matching wavelength. This makes it difficult to match it to the wavelength of an incident fundamental wave, as well as conduct a stable high-output operation. However, if the fiber 70 is used, then as described above, the effect of such a stress by the hold member 63 and the heating effect on the fiber grating 25 by doping the fiber 70 optimally with a rare earth element contribute to widening the grating interval. Thereby, the wavelength of the fundamental wave 45 shifts to the long-wavelength side. As a result, the difference between the shift length in the fundamental-wave output wavelength and the shift length in the phase matching wavelength can be shortened.

Incidentally, the hold member 63 of FIG. 14 is made of an incombustible material, and a material for the fiber 70 is selected by taking safety sufficiently into account. Further, in FIG. 14, around the clad part 43 of the fiber 70, no coating is given to its area in which the fiber grating 25 is formed. However, a re-coating part may also be provided in this area.

Eighth Embodiment

In an eighth embodiment of the present invention, the output of a laser beam after its wavelength has been converted is controlled based on tabled data stored beforehand. The whole of a wavelength converter according to the eighth embodiment has the same configuration as FIG. 13. Thus, it is not shown in any figure, and a control operation will be described using FIG. 13.

In this embodiment, the light outputted by the wavelength converter is detected by the photo-detector 29. Then, the part 32, 34 of the fundamental-wave output is detected by the photo-detector 33, 35, respectively, and at least either one is used. Besides, the temperature of each of the fiber grating 25 of the fiber 24 and the wavelength conversion element 27 can be controlled by the Peltier element 66, 67, respectively. Those photo-detectors 29, 33 and 35 and Peltier elements 66 and 67 are all connected to the output controller 30b, so that the whole can be controlled.

Ordinarily, in terms of a variation in reflection wavelength in a fiber grating in accordance with the output of a fundamental wave, it varies at 0.01 nm/K. Hence, if the fundamental-wave output becomes 5 to 10 W and the internal temperature of a wavelength conversion element rises, then because the phase matching wavelength of the wavelength conversion element varies at 0.05 nm/K, its variation becomes extremely large. This makes it difficult to adjust the wavelength.

Therefore, in this embodiment, as described in the third to seventh embodiments, the core part, the clad part or the like of the fiber 24 is doped with a rare earth element. Thereby, a part of the fundamental-wave output or the pumping light is absorbed, so that the fiber grating 25 is heated to raise its internal temperature. As a result, even if the fundamental-wave output becomes about 5 to 10 W, the internal temperature of the area where the fiber grating is formed rises higher than any conventional one. Hence, as shown in FIG. 6, the reflection wavelength of the fiber grating 25 varies more significantly than any conventional one.

In this way, even if the fundamental-wave output becomes 5 to 10 W, as shown in FIG. 6, the variation in the phase matching wavelength of the wavelength conversion element 27 and the variation in the reflection wavelength of the fiber grating 25 can be designed to be substantially equal to each other in accordance with the fundamental-wave output. Besides, the temperature is controlled using the Peltier elements 66 and 67, so that a wavelength of the fundamental wave selected at the fiber grating 25 can be accurately matched to the phase matching wavelength of the wavelength conversion element 27. As a result, the infrared fundamental wave having a wavelength of approximately 1060 nm is converted into the second harmonic wave by the wavelength conversion element 27 and turns into green high-output light of class W whose wavelength is 530 nm.

For the purpose of performing a more stable operation, measuring basic data in advance and putting it in a table are effective. Specifically, using the environment temperature as a parameter, a variation is taken in reflection wavelength at the fiber grating 25 according to the fundamental-wave output. Together with this, using the environment temperature as a parameter, a variation is taken in phase matching wavelength at the wavelength conversion element 27 according to the fundamental-wave output. Such data is tabled and inputted beforehand and is stored in the output controller 30b of FIG. 13. On top of this, the wavelength converter's fundamental-wave output is detected, and with reference to the tabled data, each temperature of the fiber grating 25 and the wavelength conversion element 27 is controlled with high precision. This makes it possible to obtain a visible light output which is stable and has a class of W.

Figure 15:
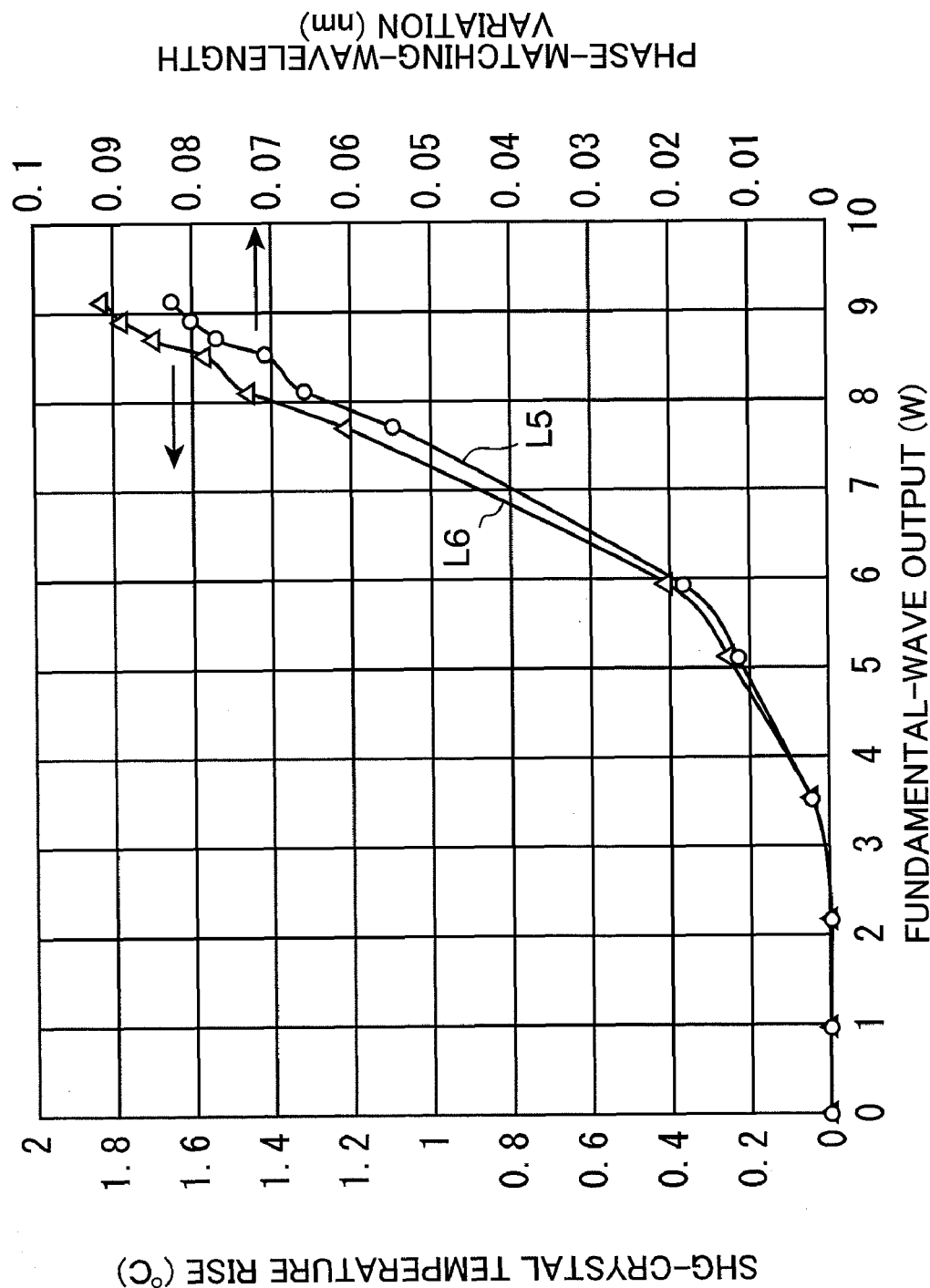
FIG. 15 is a graphical representation, showing a measurement result of a variation in the phase matching wavelength and a rise in the temperature of a wavelength conversion element in accordance with the output of a fundamental wave.

Furthermore, when the above described temperature control is executed, as shown in FIG. 15, preferably, data including not only a variation L5 in the phase matching wavelength of the wavelength conversion element 27 relative to the fundamental-wave output, but also a rise L6 in the temperature of the wavelength conversion element 27 relative to the fundamental-wave output and the like, should be taken in advance and tabled as data to be stored. With reference to such tabled data, the temperature of each of the fiber grating 25 and the wavelength conversion element 27 can be more precisely controlled.

Ninth Embodiment

Figure 16:
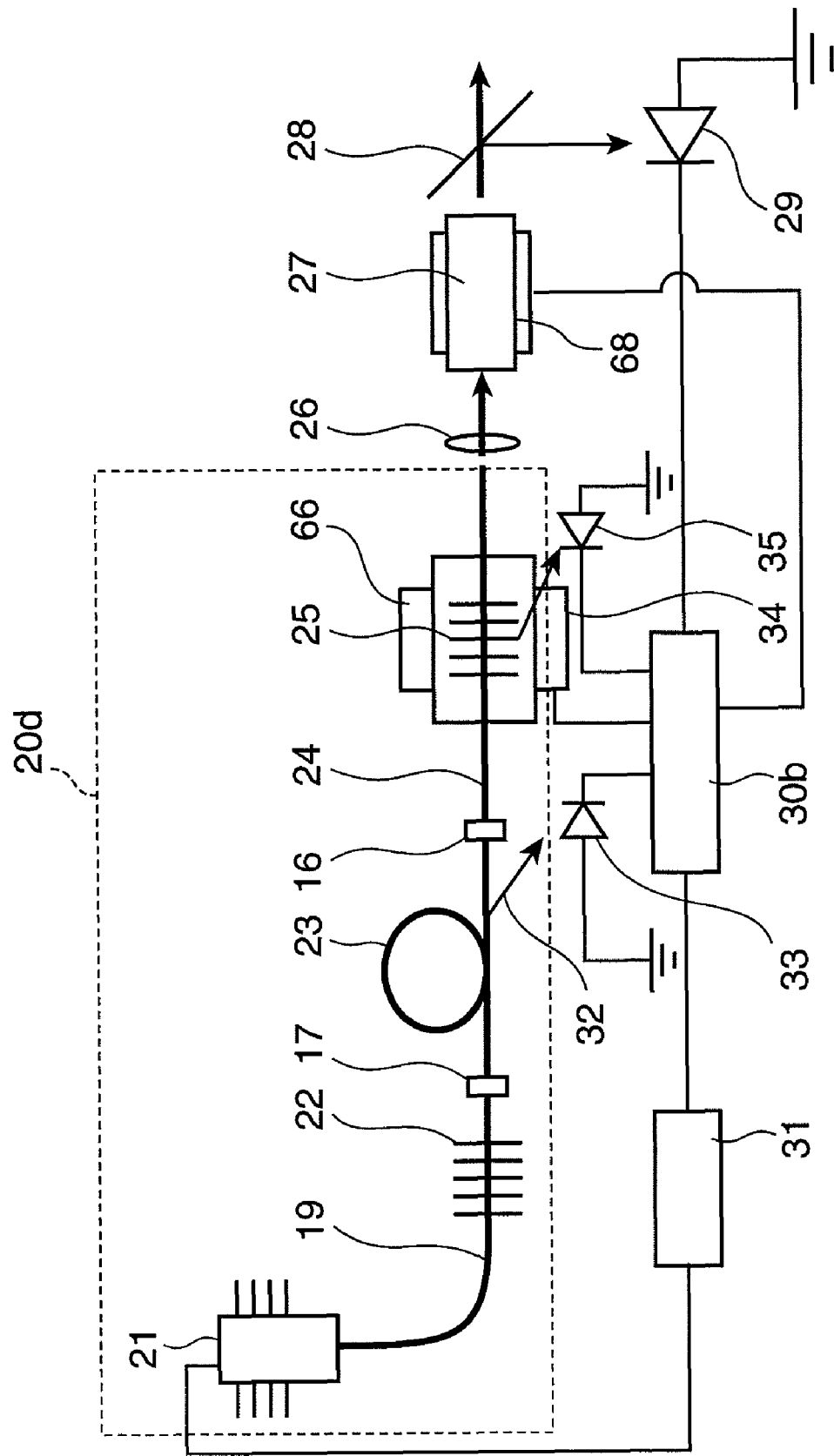
FIG. 16 is a block diagram, showing a schematic configuration of a wavelength converter according to a ninth embodiment of the present invention.

FIG. 16 is a block diagram, showing a schematic configuration of a wavelength converter according to a ninth embodiment of the present invention. The wavelength converter according to the ninth embodiment is provided with a temperature sensor 68 on a holding base of the wavelength conversion element 27, and the temperature of the fiber grating 25 is controlled by the Peltier element 66 or the like. Specifically, in this embodiment, instead of the Peltier element 67 for controlling the wavelength conversion element 27 according to the seventh embodiment, the temperature sensor 68 detects the temperature of the wavelength conversion element 27. According to this configuration, as shown in FIG. 15, a variation in the phase matching wavelength of the wavelength conversion element 27 and a rise in the element temperature relative to the fundamental-wave output can be acquired. If these figures are acquired, then to the phase matching wavelength of the wavelength conversion element 27, the wavelength of the fundamental wave as its incident wave can be matched. This wavelength of the fundamental wave is controlled with high precision by the Peltier element 66 which controls the temperature of the fiber grating 25. Therefore, as described above, this wavelength converter can output a visible class-W laser beam in a stable manner.

Tenth Embodiment

Figure 17:
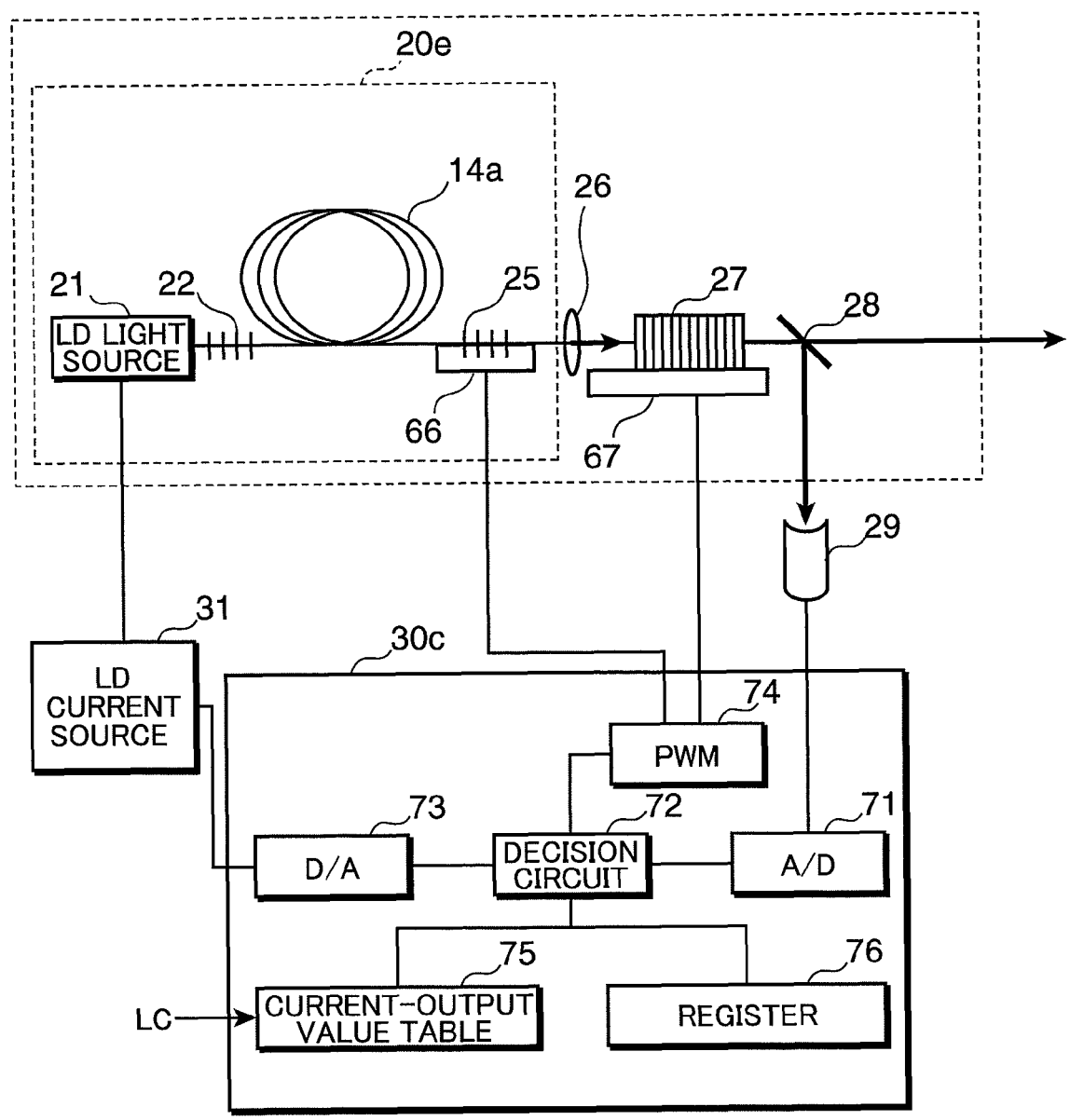
FIG. 17 is a block diagram, showing a schematic configuration of a wavelength converter according to a tenth embodiment of the present invention.

FIG. 17 is a block diagram, showing a schematic configuration of a wavelength converter according to a tenth embodiment of the present invention. The wavelength converter shown in FIG. 17 includes: a fiber laser 20e, the lens 26, the wavelength conversion element 27, the beam splitter 28, the photo-detector 29, an output controller 30c, the laser current source 31 for pumping, and the Peltier elements 66 and 67. The output controller 30c controls the Peltier element 67 as well so that the temperature of the wavelength conversion element 27 is kept constant. However, unless the temperature control of the wavelength conversion element 27 is executed, the Peltier element 67 may be omitted.

The fiber laser 20e is formed by the laser light source 21 which allows pumping light to be incident on a fiber (i.e., an optical fiber) 14a, and the fiber 14a having the fiber grating 22 and the fiber grating 25 embedded therein. The core part of the fiber 14 is doped with the rare earth element Yb as the laser active substance at a concentration of 10000 ppm, while its clad part is not doped with any rare earth element. The temperature of the fiber grating 25 is controlled by the Peltier element 66. Otherwise, the fiber laser 20e has the same configuration and conducts the same operation as the fiber laser 20 shown in FIG. 1.

The output controller 30c includes an A/D converter 71, a decision circuit 72, a D/A converter 73, a PWM signal generator 74, a current-output value table 75, and a register 76. The output controller 30c controls the temperature of the fiber grating 25 using the Peltier element 66. If necessary, a thermistor may be provided which takes the temperature of a predetermined place inside of the wavelength converter.

In the current-output value table 75, each set value at the time of factory shipping is stored in advance. The output value of green light relative to the value of an electric current supplied to the laser light source 21 is stored in a table form. These values correspond to each reference value when control is executed. The register 76 is used for temporarily storing a current value and an output value employed at the time of control.

The output value of green light to be outputted by this wavelength converter is determined according to a light-quantity control signal LC which is an external signal. The current-output value table 75 receives the light-quantity control signal LC and notifies the decision circuit 72 of a green-light output value set by the light-quantity control signal LC. The decision circuit 72 is formed by a microcomputer, and with reference to the current-output value table 75, it notifies, via the D/A converter 73, the pumping laser-current source 31 of the current value corresponding to the output value set by the light-quantity control signal LC.

The photo-detector 29 receives green light partly reflected by the beam splitter 28. Then, it outputs, to the A/D converter 71, an output detection signal which is a voltage signal corresponding to the intensity of this green light. The A/D converter 71 converts the analog-form output detection signal into a digital-form output detection signal and outputs it to the decision circuit 72. According to this output detection signal, the decision circuit 72 controls the temperature of the fiber grating 25 using the Peltier element 66.

Figure 18:
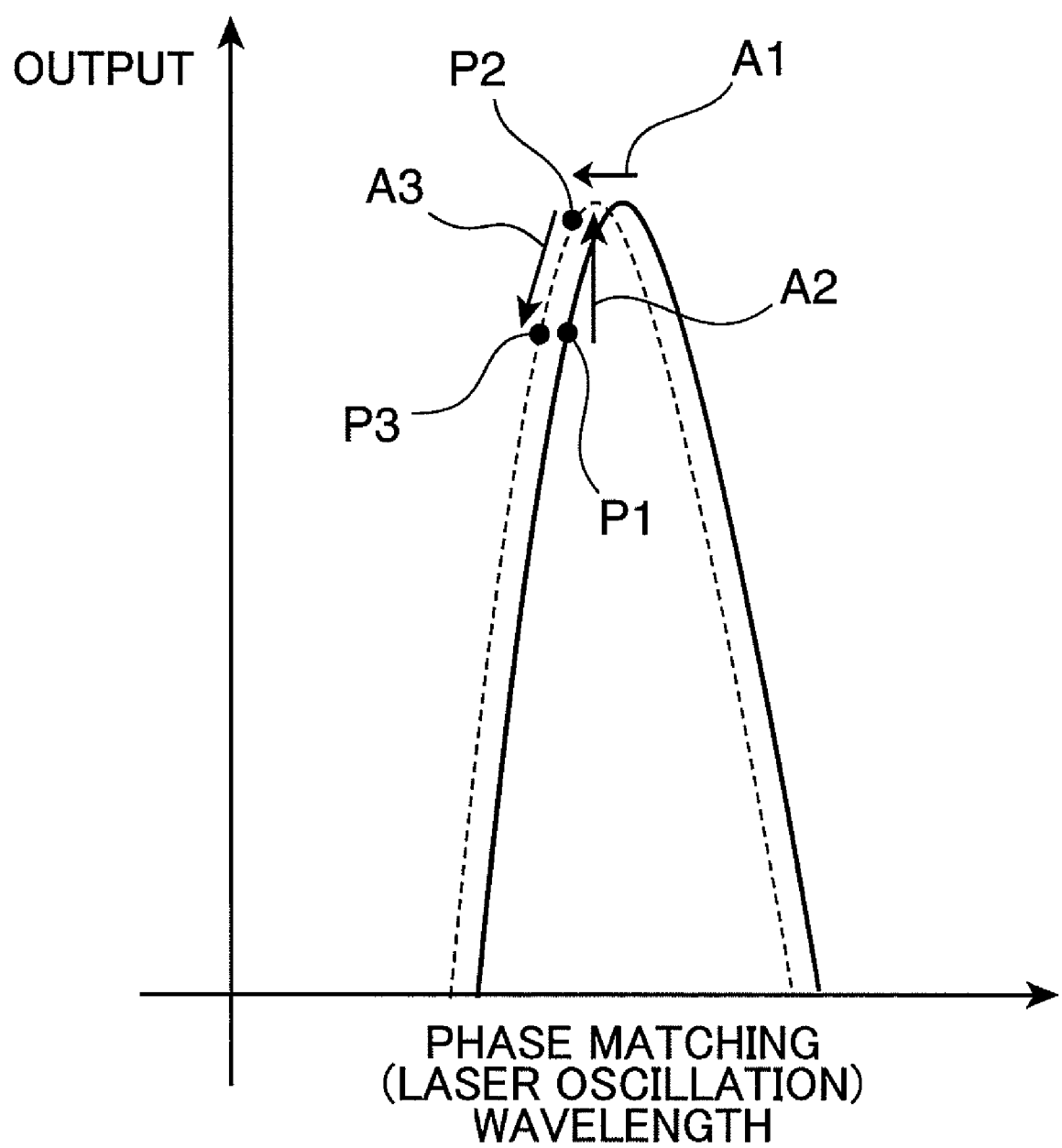
FIG. 18 is a graphical representation, illustrating a variation in a phase matching wavelength when the temperature of a wavelength conversion element falls.
Figure 19:
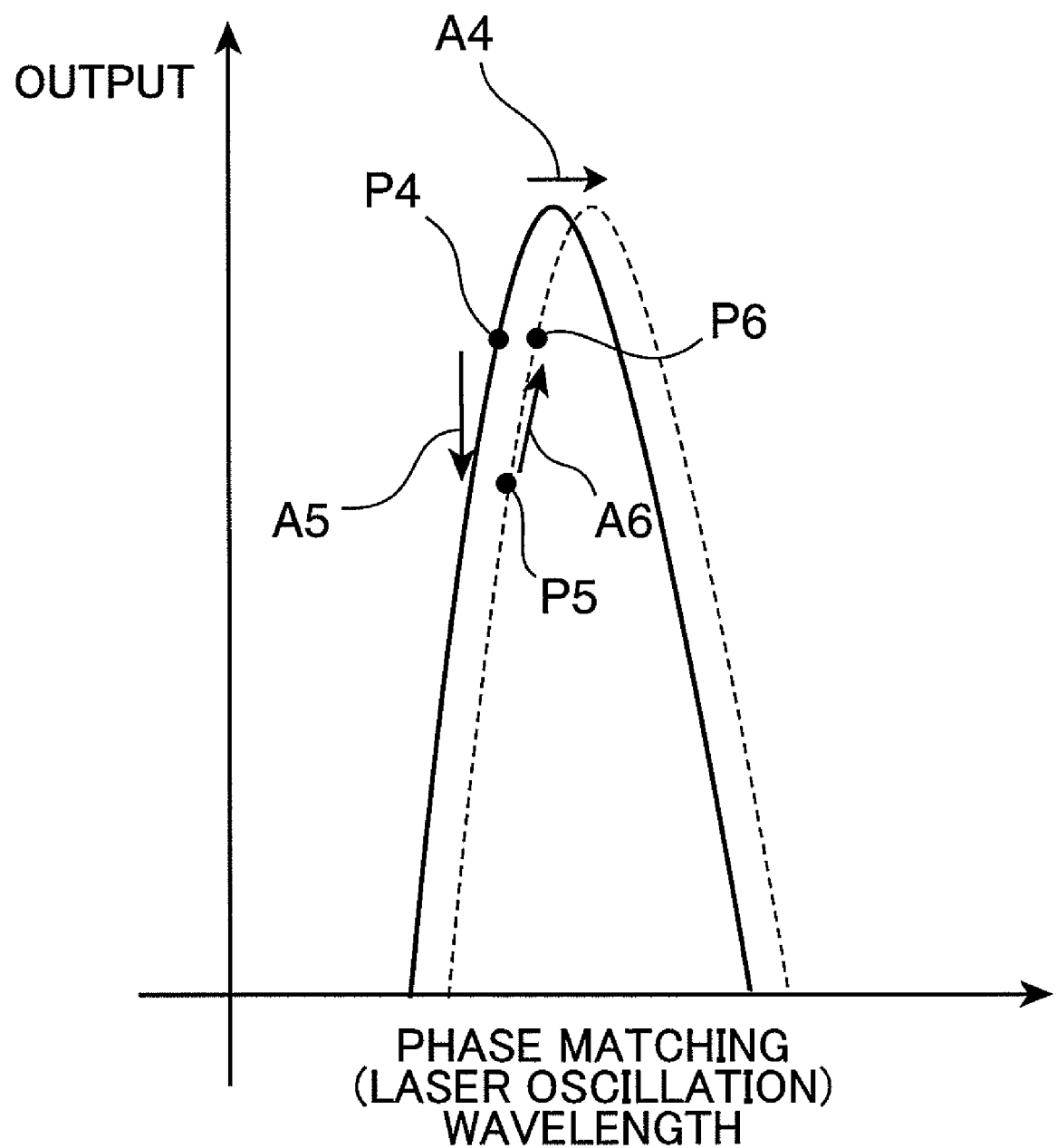
FIG. 19 is a graphical representation, illustrating a variation in the phase matching wavelength when the temperature of the wavelength conversion element rises.

Next, a description will be given about the temperature control of the fiber grating 25 by the decision circuit 72. FIG. 18 is a graphical representation, illustrating a variation in phase matching wavelength when the temperature of the wavelength conversion element 27 falls. FIG. 19 is a graphical representation, illustrating a variation in the phase matching wavelength when the temperature of the wavelength conversion element 27 rises.

First, in a standby state after the wavelength converter is started up, the decision circuit 72 instructs the PWM signal generator 74 to output a PWM signal for setting the temperature of the fiber grating 25 to a standby temperature. Using the Peltier element 66, the PWM signal generator 74 adjusts the temperature of the fiber grating 25 to the standby temperature. Herein, as the standby temperature, for example, a temperature can be used which is 85 to 95% of a phase matching temperature at the peak of the intensity of a higher harmonic wave and is lower than the phase matching temperature.

In this way, the temperature of the fiber grating 25 is controlled so as to be the standby temperature, and in a standby position where the green light outputted from the wavelength conversion element 27 becomes 85 to 95% of the peak output, the green light is outputted. While it is outputted, if the temperature of the wavelength conversion element 27 falls, as shown in FIG. 18, the characteristic curve of the phase matching wavelength relative to the green-light output changes, as shown by an arrow A1, from the solid line to the broken line and shifts to the left-hand side in this figure or the short-wavelength side. Herein, if the above described standby position is a point P1, as shown by an arrow A2, the green-light output moves to a point P2 and goes up. At this time, the wavelength of the fundamental wave is shifted to the short-wavelength side by lowering the temperature of the fiber grating 25, then as shown by an arrow A3, the green-light output moves to a point P3 and becomes equal to that of the point P1. Thereby, the output can be recovered.

On the other hand, while the green light is outputted in the above described standby position, if the temperature of the wavelength conversion element 27 rises, as shown in FIG. 19, the characteristic curve of the phase matching wavelength relative to the green-light output changes, as shown by an arrow A4, from the solid line to the broken line and shifts to the right-hand side in this figure or the long-wavelength side. Herein, if the above described standby position is a point P4, as shown by an arrow A5, the green-light output moves to a point P5 and goes down. At this time, the wavelength of the fundamental wave is shifted to the long-wavelength side by raising the temperature of the fiber grating 25, then as shown by an arrow A6, the green-light output moves to a point P6 and becomes equal to that of the point P4. Thereby, the output can be recovered.

As described above, the phase-matching wavelength of the wavelength conversion element 27 is set to the standby position, so that the environment temperature in operation can be monitored. Specifically, when the phase-matching wavelength of the wavelength conversion element 27 lies in the standby position, it can be seen that the environment temperature lowers if the green-light output goes up while the environment temperature lifts if the green-light output goes down. On the basis of this output value, therefore, the temperature of the fiber grating 25 can be controlled.

Figure 20:
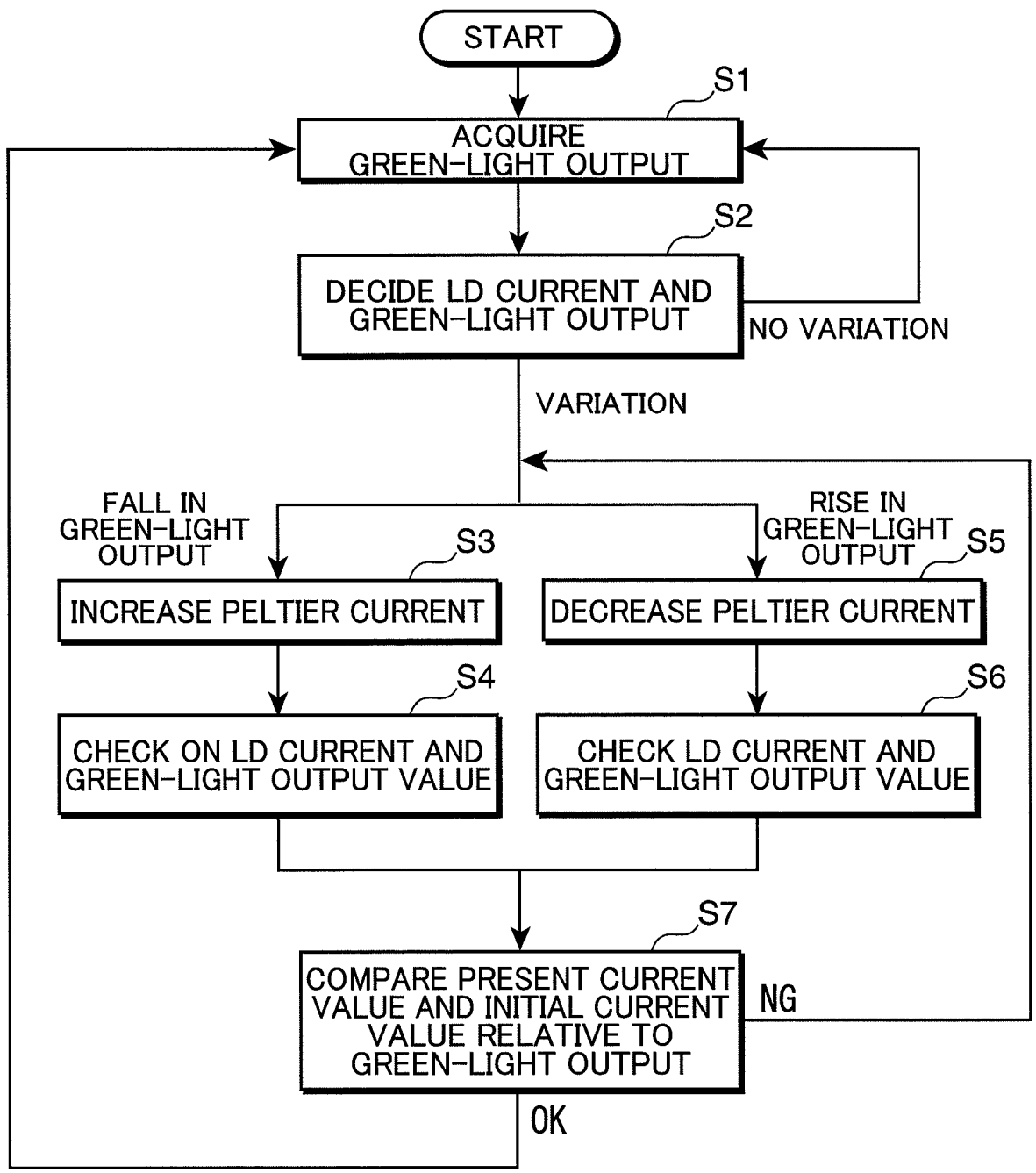
FIG. 20 is a flow chart, showing a temperature control processing for a fiber grating by a decision circuit shown in FIG. 17.

FIG. 20 is a flow chart, showing a temperature control processing for the fiber grating 25 by the decision circuit 72 shown in FIG. 17. First, in a step S1, the decision circuit 72 acquires the green-light output value determined according to the light-quantity control signal LC from the current-output value table 75. Via the D/A converter 73, it controls the current value of the pumping laser-current source 31 so that the output value of the wavelength conversion element 27 becomes the acquired output value.

Next, in a step S2, the decision circuit 72 verifies that the current value of the pumping laser-current source 31 is within a predetermined usage range. Using the output detection signal outputted from the photo-detector 29, it decides whether the green-light output value has varied or not. If the green-light output value has varied and fallen, the processing moves to a step S3, while the processing goes ahead to a step S5 if it has risen. In contrast, if the green-light output value has not varied, the processing is repeated from the step S1 and the green light according to the light-quantity control signal LC is outputted.

If the green-light output value has fallen, in the step S3, the decision circuit 72 instructs the PWM signal generator 74 to increase the average value of an electric current flowing through the Peltier element 66. The PWM signal generator 74 lowers the temperature of the Peltier element 66 to cool the fiber grating 25. Next, in a step S4, the decision circuit 72 checks that the current value of the pumping laser-current source is within the predetermined usage range. Using the output detection signal outputted from the photo-detector 29, it checks the green-light output value.

On the other hand, if the green-light output value has risen, in the step S5, the decision circuit 72 instructs the PWM signal generator 74 to decrease the average value of the electric current flowing through the Peltier element 66. The PWM signal generator 74 raises the temperature of the Peltier element 66 to heat the fiber grating 25. Next, in the step S5, the decision circuit 72 checks that the current value of the pumping laser-current source 31 is within the predetermined usage range. Using the output detection signal outputted from the photo-detector 29, it checks the green-light output value.

After the processing of the step S4 or S5 is completed, the decision circuit 72 compares, with an initial current value, the current value of the pumping laser-current source 31 relative to the green-light output value after the above described processing is executed. If the difference between both is within a predetermined range, the processing of the step S1 and its following is continued. In contrast, the difference between both is out of the predetermined range, the processing of each step S3, S4 and its succeeding step, respectively, is continued.

Through the above described processing, in this embodiment, the fiber grating 25 can be heated according to the green-light output value. Therefore, the length of a shift in the phase matching wavelength in accordance with a rise in the temperature can be matched to the length of a shift in the wavelength of the fundamental wave. This makes it possible to stably obtain green light with a high class-W output from the wavelength conversion element 27.

In addition, in this embodiment, the temperature of the wavelength conversion element 27 is controlled by the Peltier element 67. However, the temperature of the wavelength conversion element 27 rises higher on the output side of the wavelength conversion light than on the input side of the fundamental wave. Hence, as described below, the Peltier element 67 may be replaced with a plurality of Peltier elements so that the temperature of the wavelength conversion element 27 can be controlled separately at the part on the input side and at the part on the output side.

Figure 21:
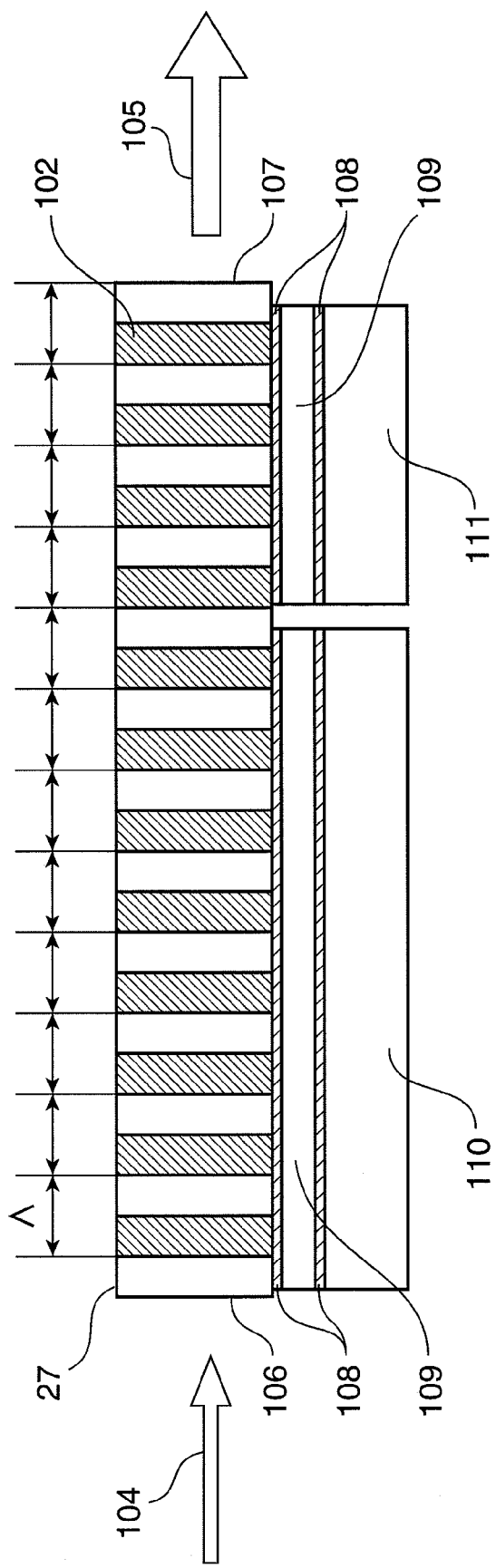
FIG. 21 is a schematic view of a wavelength conversion element and a plurality of Peltier elements, showing their configuration where the wavelength conversion element's temperature is controlled by the Peltier elements.

FIG. 21 shows a configuration in the case where the temperature of a wavelength conversion element is controlled by a plurality of Peltier elements. As shown in FIG. 21, a plurality of Peltier elements 100 and 111 are provided in the directions where light propagates on the wavelength conversion element 27. The wavelength conversion element 27 is formed with a cyclic polarization-inversion area 102. This polarization-inversion area 102 is created in an electric-field application method.

The substrate of the wavelength conversion element 27 has a thickness of 1 mm, and the polarization-inversion area 102 is formed along the Y-axis of its substrate crystal. Then, the polarization-inversion area 102 is formed from the +Z plane toward −Z plane of the substrate. A polarization-inversion cycle Λ is 6.97 μm, and light (Nd:YAG laser beam) having a wavelength of 1064 nm can be converted into green light having a wavelength of 532 nm.

Onto the surface of the wavelength conversion element 27, two copper plates 109 for heat radiation are attached via a heat radiation agent 108. Then, via the heat radiation agent 108, the Peltier elements 100 and 111 are attached to the two copper plates 109. As a temperature-adjustment control element which controls the temperature of the wavelength conversion element 27 the two Peltier elements 100 and 111 are used. The Peltier element 100 and the Peltier element 111 are set in array in the light-propagation directions, so that they can execute control at a temperature independent of each other.

Figure 22:
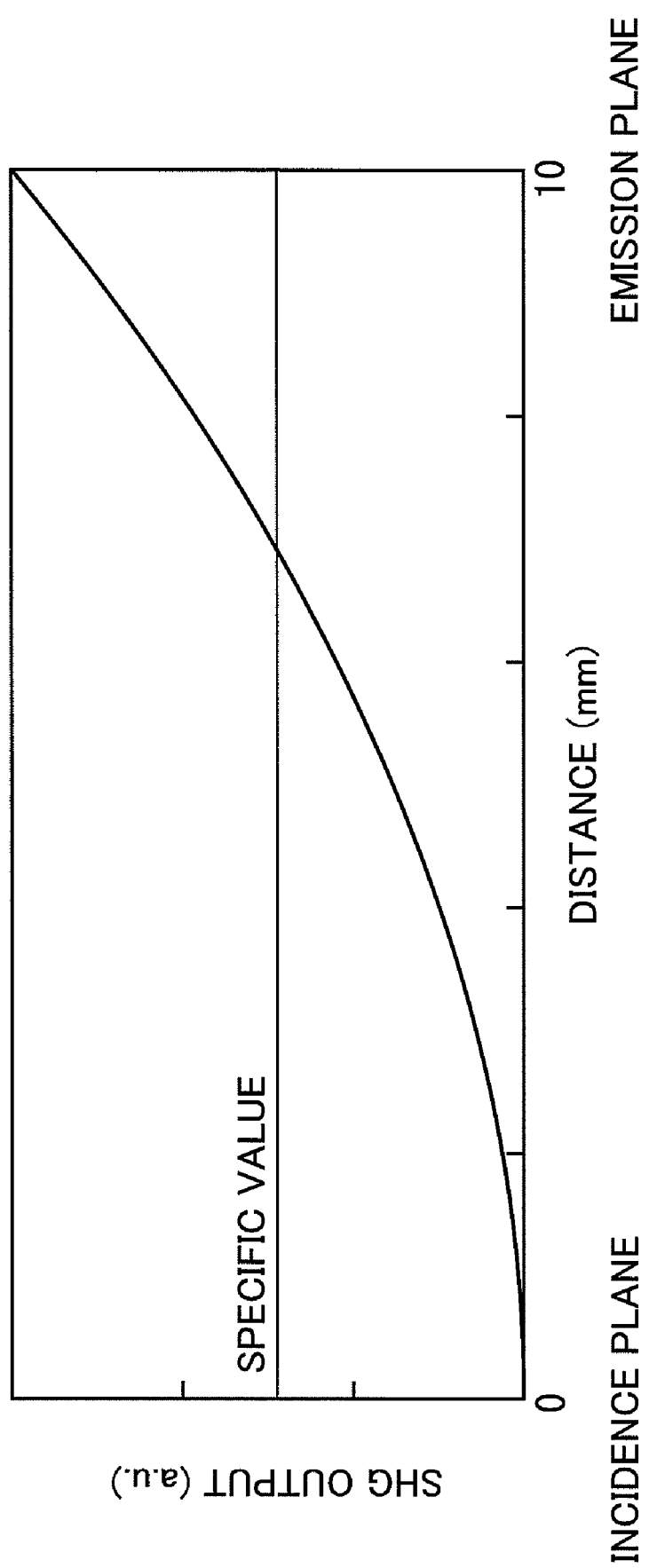
FIG. 22 is a graphical representation, showing the relation between a distance from the incidence plane of the wavelength conversion element and the power of an SHG.

FIG. 22 is a graphical representation, showing the relation between a distance from an incidence plane 106 of the wavelength conversion element 27 and the power of an SHG. For example, in the wavelength conversion element 27, a fundamental wave having a wavelength of 1064 nm is converted into an SHG (i.e., a higher harmonic wave) having a wavelength of 532 nm. In this case, if the input of the fundamental wave is 10 W, the concentrated-beam diameter of the fundamental wave is ϕ33 μm and the beam quality of the fundamental wave has a Gaussian distribution in an almost ideal state, then as the wavelength conversion element 27 has a length of 10 mm, the intensity of the SHG exceeds 1.5 W in a position approximately 7 mm from the incidence plane 106 of the wavelength conversion element 27. The value of P (i.e., degradation) when the SHG has a wavelength of 532 nm is approximately 1.5 W. Therefore, as the temperature control of the wavelength conversion element 27, the Peltier element 111 which conducts such temperature control is placed closely within a range of 3 mm from an emission plane 107 near the emission part of this element in its longitudinal directions. Then, if the temperature control is conducted, the conversion efficiency of the wavelength conversion element 27 can be significantly enhanced.

Figure 23:
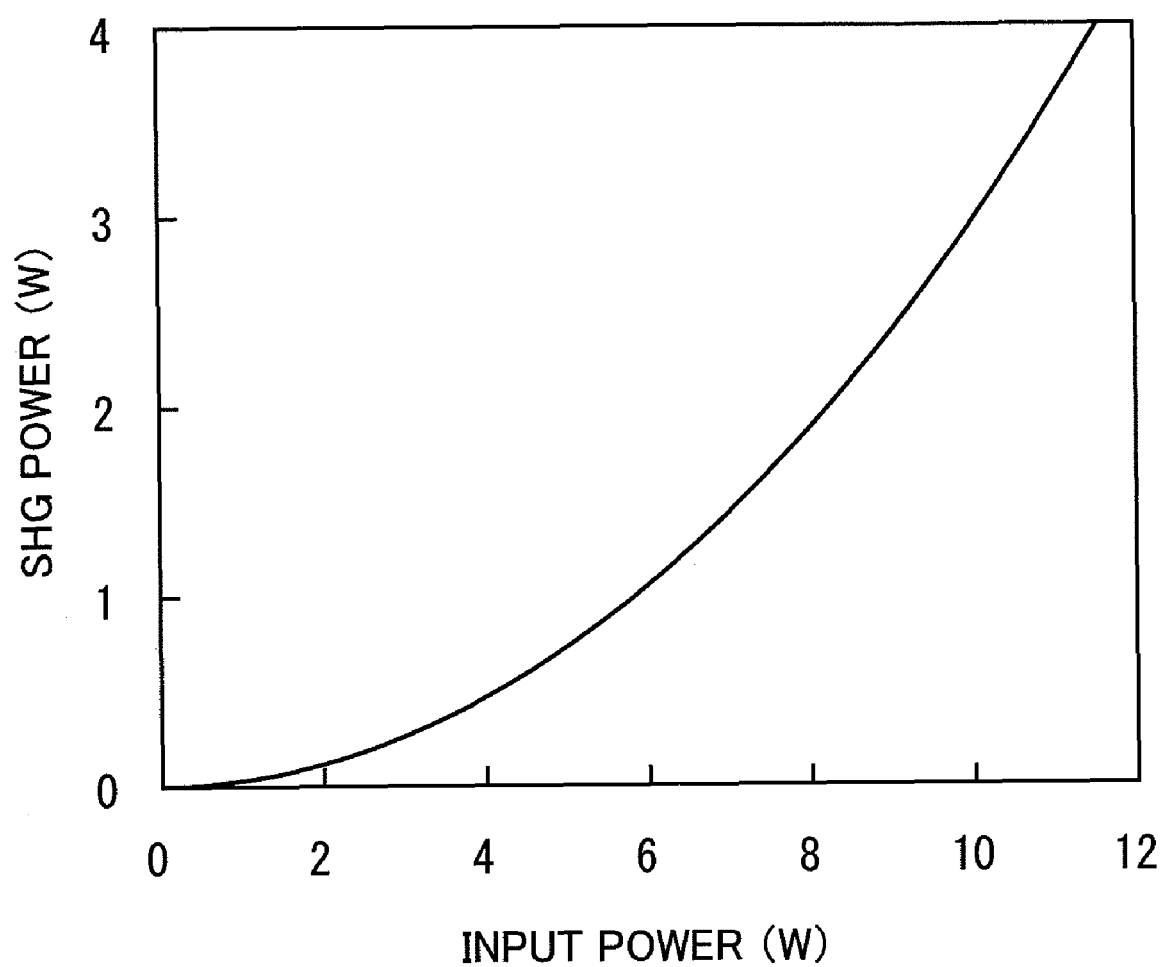
FIG. 23 is a graphical representation, showing a measurement result of the output characteristic of a green light when the wavelength conversion element's temperature is controlled by the plurality of Peltier elements.

FIG. 23 shows a measurement result of the output characteristic of a green light when the temperature of the wavelength conversion element 27 having the above described configuration is controlled by the Peltier elements 100 and 111. As shown in FIG. 23, the conversion efficiency at the time when the SHG power is 1.5 W or below is 3%/W. Even if the SHG power becomes 1.5 W or above, the square characteristic's degradation, the output's unstableness and the conversion efficiency's decline are not produced. This helps obtain a high-quality beam profile with a stable output.

Figure 24:
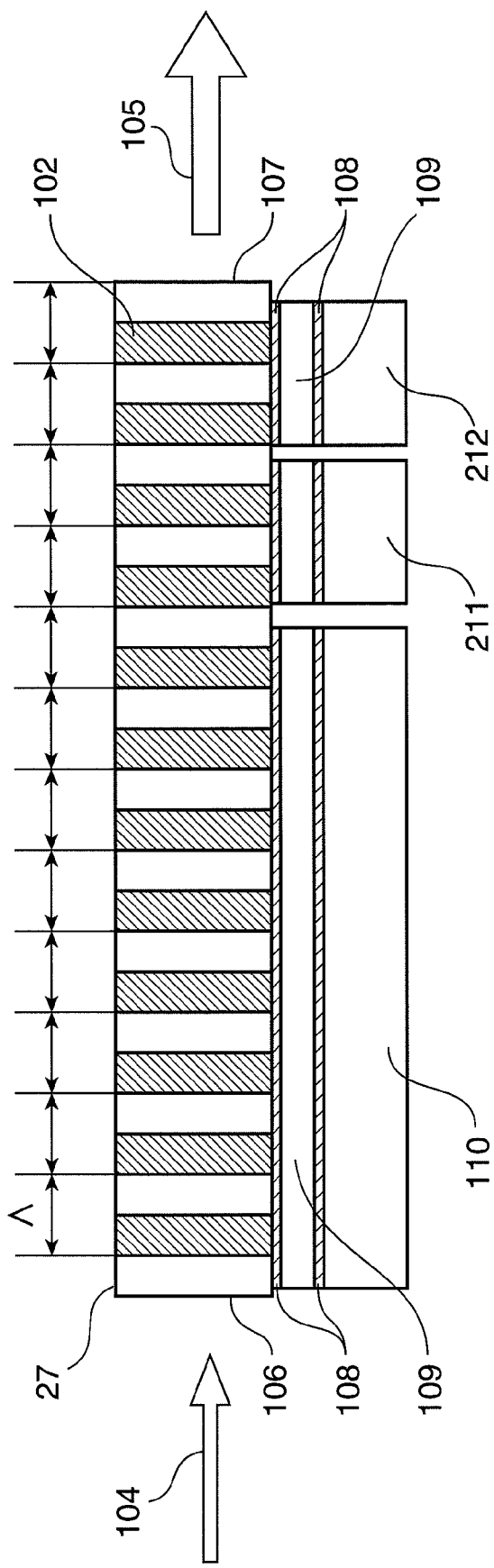
FIG. 24 is a schematic view of a wavelength conversion element and a plurality of Peltier elements, showing that two Peltier elements are disposed near the emission plane where the power of an SHG is degraded.
Figure 25:
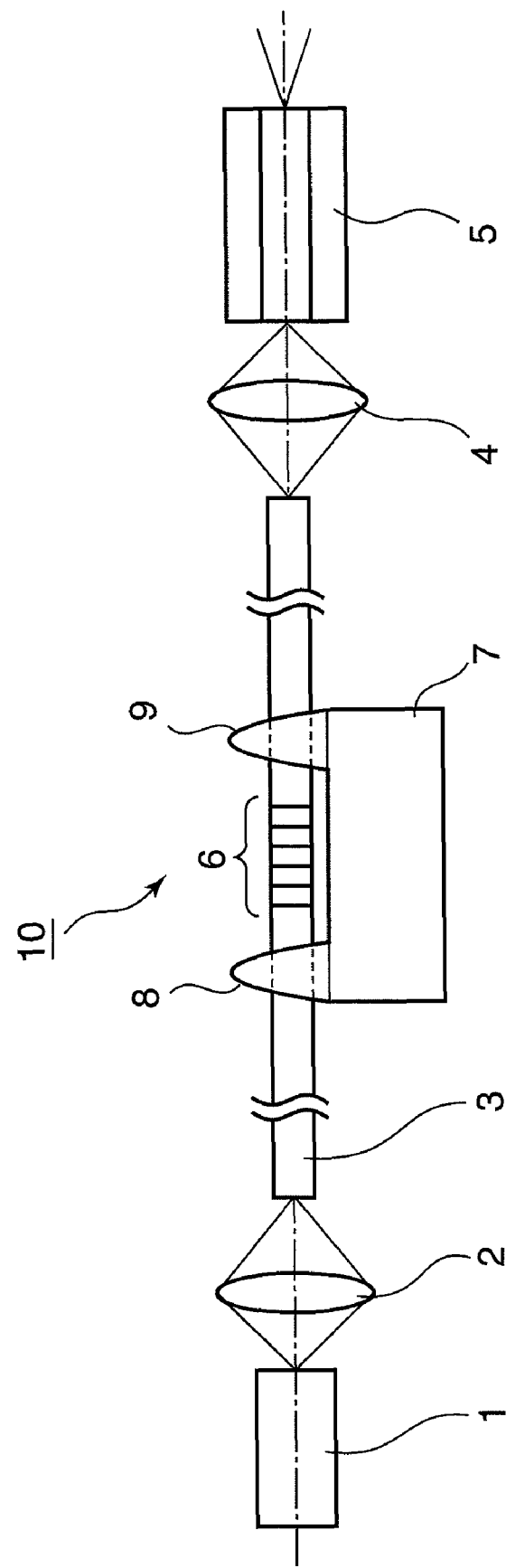
FIG. 25 is a block diagram, showing a schematic configuration of a conventional wavelength converter.

In this example, in order to evade a temperature distribution to be generated in the propagation directions, the temperature control is conducted by placing the single Peltier element 111 in the vicinity of the emission plane 107 where a rise in the temperature emerges conspicuously. However, as such a Peltier element, two or more may be provided in the vicinity of the emission plane 107 where the SHG power is degraded. As shown in FIG. 24, a plurality of Peltier elements 211 and 212 are provide in the vicinity of the emission plane 107 of the wavelength conversion element 27 where heat generation is concentrated so that the temperature of this element becomes uniform in line with a temperature distribution in the light propagation directions. In terms of how to arrange such Peltier elements, the present invention is not limited to this arrangement, as long as the temperature is restrained from being distributed.

In addition, desirably, the length in the vicinity of the emission plane 107 over which it is controlled individually by the Peltier elements should be half the full length or below. In the case of a bulk-type wavelength conversion element, its concentrated-beam point comes to the middle of a crystal. If the concentrated-beam characteristic of a fundamental wave is set so that the fundamental-wave beam diameter becomes the maximum at both ends of the crystal, the conversion efficiency becomes highest. At this time, the intensity of an SHG inside of the element at its emission plane is about three times as great as the power at the middle part of the element. As a result of an experiment, it is found out that if the maximum output becomes three or more times as great as P (i.e., degradation) which causes the conversion efficiency to be deteriorated, light absorption can destroy the crystal. Therefore, even if the length near the emission plane 107 over which it is individually controlled is set to half the element length or above, the output light cannot be increased. Hence, it is preferable that such a length be set to half the element length or below.

The temperature adjustment method in this example is not limited especially to the above described example. Thus, a heat-radiation characteristic may be designed to be excellent in a place where the power of an SHG and the power density of the SHG near the emission plane of a wavelength conversion element become greatest. Or, the element temperature may be restrained from being distributed by heating a part in which no SHG-power degradation takes place so as to coincide with the temperature of the place where the SHG power and the SHG power density near the emission plane of the wavelength conversion element become greatest.

Incidentally, in each embodiment described so far, the output of the wavelength converter is described using a green laser beam having a wavelength of 530 nm. However, the wavelength converter's output wavelength may be from an ultraviolet range to an infrared range including a visible-light range of 400 to 900 nm. Besides, if the wavelength of a fiber laser beam is also a wavelength of 800 to 1800 nm, the same advantages as the contents given in each embodiment described earlier can be obtained. In addition, each embodiment described above can be optionally combined, and in that case alike, the advantages according to each configuration can be obtained.

From each embodiment described so far, the present invention is summarized in the following. Specifically, a wavelength converter according to the present invention comprises: a laser resonator which is formed by optically connecting a fiber that includes a laser active substance and is formed with two fiber gratings, and a laser light source that allows pumping light to be incident on the fiber; and a wavelength conversion element which converts the fundamental wave of a laser beam emitted from the laser resonator into a higher harmonic wave, the fiber gratings including a first fiber grating on the side of the laser light source and a second fiber grating on the side of the wavelength conversion element, and the temperature of the second fiber grating being adjusted in accordance with the output of a higher harmonic wave outputted from the wavelength conversion element.

In this wavelength converter, the temperature of the second fiber grating on the side of the wavelength conversion element is adjusted in accordance with the output of a higher harmonic wave outputted from the wavelength conversion element. Therefore, the second fiber grating's temperature can be more significantly raised than any conventional one, so that the fundamental wave's wavelength can be largely shifted. As a result, the fundamental wave's wavelength can be shifted so as not to separate from the wavelength which can be converted by the wavelength conversion element. This makes it possible to stably obtain high-output wavelength conversion light of class W from the wavelength conversion element.

It is preferable that the fiber be doped with a rare earth element at a set concentration and absorbs a part of the output of the fundamental wave or the pumping light.

In this case, the fiber is doped with a rare earth element at a set concentration, so that it absorbs a part of the output of the fundamental wave or the pumping light which propagates through its inside. This absorbed light turns into heat, which heats the fiber grating that selects a wavelength of the fundamental waved. The fiber grating is heated to raise its temperature, and its thermal expansion widens the grating interval. Thereby, the fundamental-wave wavelength shifts largely to the long-wavelength side.

If one tries to obtain a laser beam with a high class-W output from the wavelength conversion element, the fundamental-wave output becomes approximately 10 W. Thus, the wavelength conversion element's internal temperature rises and the convertible wavelength shifts largely to the long-wavelength side. In general, even if the output of the fundamental wave which propagates on the fiber heightens from several watts to about 10 watts, the fundamental-wave wavelength shifts only a little to the long-wavelength side. However, in the above described fiber which is doped with a rare earth element at a set concentration and thereby absorbs a part of the output of the fundamental wave or the pumping light which propagates through its inside, the fundamental-wave wavelength shifts largely to the long-wavelength side. As a result, the wavelength of the fundamental wave incident on the wavelength conversion element can be closely followed by the wavelength which can be converted by the wavelength conversion element, so that it can be shifted to the long-wavelength side. Therefore, in the above described wavelength converter, the output light subjected to a wavelength conversion can be obtained up to a high class-W output.

As described above, the fiber is doped with a rare earth element, so that it absorbs a part of the output of the fundamental wave or the pumping light of the laser beam. With the heat produced through the absorption, the fiber grating is heated to raise its temperature. Thereby, the temperature of the fiber grating rises higher than any conventional one, so that the grating interval becomes wider. This causes the fundamental-wave wavelength to shift largely so that it will not separate from the wavelength convertible by the wavelength conversion element. This helps realize the wavelength converter which is capable of obtaining to a stable high class-W output. In other words, a visible light source with a high class-W output can be put into practice, which have been conventionally difficult to realize. This offers an advantage in that such a small-sized productive light source can be applied to a large-sized display or a high-intensity display.

It is preferable that the rare earth element be at least one chosen from among Nd, Er, Dy, Pr, Tb and Eu. Preferably, the fiber should be doped with the rare earth element at a concentration of 1000 to 3000 ppm.

In this case, the fiber is doped with a chosen rare earth element at a set concentration, so that the fiber grating can be effectively heated.

It is preferable that the rare earth element be at least one chosen from among Yb, Ce, Tm, Ho, Gd, Y and La. Preferably, the fiber should be doped with the rare earth element at a concentration of 20000 to 30000 ppm.

In this case alike, the fiber is doped with a chosen rare earth element at a set concentration, so that the fiber grating can be effectively heated.

It is preferable that the clad part of the fiber be doped with the rare earth element.

In this case, the fiber's clad part is doped with the rare earth element, so that the fiber grating can be more effectively heated.

It is preferable that the core part of the fiber be doped with the rare earth element.

In this case, the fiber's core part is doped with the rare earth element, so that the fiber grating can be more effectively heated.

It is preferable that the fiber be formed by optically connecting a first fiber formed with the first fiber grating and a second fiber formed with the second fiber grating.

In this case, a fiber formed with the second fiber grating which selects a fundamental wave can be created as the second fiber, separately from the first fiber. Therefore, the second fiber is doped with a chosen rare earth element at a set concentration near the fiber grating. Thereby, it can be created so as to absorb more efficiently a part of the output of the fundamental wave or the pumping light. Besides, the first fiber can also be configured to include a laser active substance and convert the pumping light more efficiently into the fundamental wave.

It is preferable that: the fiber be made up of a first fiber formed with the first fiber grating, a second fiber, and a third fiber formed with the second fiber grating; and the first fiber and the third fiber be optically connected to both ends of the second fiber.

In this case, a fiber formed with the second fiber grating which selects a fundamental wave can be created as the third fiber, separately from the first fiber. Therefore, the third fiber is doped with a chosen rare earth element at a set concentration near the fiber grating. Thereby, it can be created so as to absorb more efficiently a part of the output of the fundamental wave or the pumping light. Besides, the first fiber can also be configured to include a laser active substance and convert the pumping light more efficiently into the fundamental wave. In addition, the second fiber may be designed so as not to absorb a part of the output of the fundamental wave or the pumping light as much as possible. This makes it possible to further reduce the loss of the fundamental wave or the pumping light inside of the second fiber.

It is preferable that the fiber have a double-clad structure.

In this case, at least either clad part in the double-clad structure absorbs a part of the fundamental wave or the pumping light, so that the fiber grating can be more effectively heated.

It is preferable that in the double-clad structure, at least either clad part be doped with the rare earth element.

In this case, at least either clad part in the double-clad structure is doped with the rare earth element, and thereby, absorbs a part of the fundamental wave or the pumping light, so that the fiber grating can be more effectively heated.

It is preferable that a heating portion be further provided which absorbs a part of the output of the fundamental wave or the pumping light and heats the fiber grating.

In this case, using the heating portion which absorbs a part of the fundamental wave or the pumping light, the fiber grating can be more effectively heated.

It is preferable that the heating portion be a re-coating layer provided in an area where the second fiber grating is formed.

In this case, a part of the output of the fundamental wave or a part of the pumping light which is reflected by the grating is absorbed into the re-coating layer and turns into heat, so that the fiber grating can be more effectively heated.

It is preferable that the re-coating layer be made of an incombustible material.

In this case, the fiber can secure greater safety.

It is preferable that the material of the re-coating layer have a refractive index of 1.37 to 1.43.

In this case, an optimum quantity of a part of the fundamental wave or the pumping light is absorbed into the re-coating layer, so that the fiber grating can be more effectively heated.

It is preferable that: the heating portion include a temperature control member which controls the temperature of the wavelength conversion element, and a holding base for holding the second fiber grating and the wavelength conversion element; and heat produced from the temperature control member be transferred through the holding base to the second fiber grating, so that the second fiber grating is heated.

In this case, heat produced through the temperature control of the wavelength conversion element is transferred via the holding base to the fiber grating, so that the fiber grating can be more effectively heated.

It is preferable that: the heating portion include a hold member which absorbs leakage light of the fundamental wave or the pumping light and generates heat, be made of a material having a greater thermal-expansion coefficient than the fiber, and hold the second fiber grating; and the hold member itself generate heat and expand thermally to apply a tensile stress to the second fiber grating.

In this case, the hold member is heated and expanded, and thereby, the fiber grating is pulled to wide the grating interval mechanically. Therefore, the fundamental-wave wavelength can be further shifted to the long-wavelength side. As a result, even if the fundamental wave has a high output, the fundamental wave's wavelength and the wavelength which can be converted by the wavelength conversion element shift in a substantially similar way. This makes it possible to control the output of a laser beam subjected to a wavelength conversion more effectively up to a high class-W output.

It is preferable that the above described wavelength converter further include: a detecting means for detecting a part of the output of the fundamental wave; and a controlling means for controlling the output of a higher harmonic wave emitted from the wavelength conversion element, based on a detection value by the detecting means.

In this case, the quantitative relation between the output of the fundamental wave corresponding to the input of the wavelength conversion element and the output of a higher harmonic wave subjected to a wavelength conversion corresponding to the output of the wavelength conversion element can be grasped in advance and referred to. This makes it possible to control the output of a laser beam subjected to a wavelength conversion more effectively up to a high class-W output.

It is preferable that the controlling means control the temperature of at least either of the fiber grating and the wavelength conversion element, based on data stored in advance in a table format.

In this case, data necessary for controlling the temperature is acquired beforehand through an experiment or the like and is stored in a table format. When the temperature is controlled, it can be used any time. This makes it possible to control the output of a laser beam subjected to a wavelength conversion more precisely up to a high class-W output.

It is preferable that the controlling means control the temperature of at least either of the fiber grating and the wavelength conversion element, based on a variation in the phase matching wavelength of the wavelength conversion element in accordance with the output of the fundamental wave.

In this case, a variation in the phase matching wavelength of the wavelength conversion element in accordance with the output of the fundamental wave is stored beforehand in a table format. When the temperature is controlled, it can be used any time. This makes it possible to control the output of a laser beam subjected to a wavelength conversion more precisely up to a high class-W output.

It is preferable that the controlling means control the temperature of at least either of the fiber grating and the wavelength conversion element, based on a variation in the reflection wavelength of the fiber grating in accordance with the output of the fundamental wave.

In this case, a variation in the reflection wavelength of the fiber grating in accordance with the output of the fundamental wave, in other words, a variation in the wavelength of the fundamental wave incident on the wavelength conversion element, is stored beforehand in a table format. When the temperature is controlled, it can be used any time. This makes it possible to control the output of a laser beam subjected to a wavelength conversion more precisely up to a high class-W output.

It is preferable that the detecting means include a photodetector which receives branch light of the fundamental wave from the fiber.

In this case, the fundamental-wave output can be quantitatively and accurately grasped. This makes it possible to control the output of a laser beam subjected to a wavelength conversion more precisely up to a high class-W output.

It is preferable that the detecting means receive leakage light of the fundamental wave from the fiber grating.

In this case, the fundamental-wave output can be quantitatively and accurately grasped. This makes it possible to control the output of a laser beam subjected to a wavelength conversion more precisely up to a high class-W output. Simultaneously, leakage light of the fundamental wave is received, so that the needless loss of the fundamental wave can be restrained.

It is preferable that the wavelength converter further include: detecting means for detecting a part of the output of the higher harmonic wave; and a controlling means for controlling the temperature of the second fiber grating, based on a detection value of the output of the higher harmonic wave by the detecting means.

In this case, the fiber grating can be heated according to the output of the higher harmonic wave. Therefore, the length of a shift in the phase matching wavelength in accordance with the temperature rise can be matched to the length of a shift in the wavelength of the fundamental wave. This makes it possible to control the output of a laser beam subjected to a wavelength conversion more precisely up to a high class-W output.

It is preferable that the wavelength of the higher harmonic wave be 510 to 550 nm and the output of the higher harmonic wave be 1 W or above.

In this case, even if the output of wavelength conversion light is reduced through ultraviolet induced green-light absorption, the green-light output after the wavelength conversion can be increased up to a high class-W output in the case where no reduction in the output is caused by such ultraviolet induced green-light absorption.

It is preferable that the wavelength of the higher harmonic wave be 440 to 490 nm and the output of the higher harmonic wave be 0.1 W or above.

In this case, even if the output of wavelength conversion light is reduced through ultraviolet induced green-light absorption, the blue-light output after the wavelength conversion can be increased up to a high class-W output in the case where no reduction in the output is caused by such ultraviolet induced green-light absorption.

INDUSTRIAL APPLICABILITY

In the wavelength converter according to the present invention, high class-W output wavelength conversion light can be stably obtained from a wavelength conversion element. Therefore, it is useful as a wavelength converter which is a high-output visible light source for a large-sized display, a high-intensity display, or the like.

The invention claimed is:
1. A wavelength converter comprising:
a fiber including a laser active substance, the fiber being formed with a first fiber grating and a second fiber grating, wherein the first fiber grating and the second fiber grating are embedded in the fiber;
a laser light source that allows pumping light to be incident on the fiber;
a laser resonator formed by optically connecting the fiber and the laser light source; and
a wavelength conversion element that converts the fundamental wave of a laser beam emitted from the laser resonator into a higher harmonic wave,
wherein the first fiber grating is arranged between the laser light source and the second fiber grating, and the second fiber grating is arranged between the first fiber grating and the wavelength conversion element;

wherein the fiber absorbs a part of an output of the fundamental wave or the pumping light, and heats the second fiber grating, and wherein the temperature of the second fiber grating is adjusted in accordance with an output of the higher harmonic wave outputted from the wavelength conversion element.

2. The wavelength converter according to claim 1, wherein: the fiber is doped with a rare earth element at a set concentration.

3. The wavelength converter according to claim 2, wherein: the rare earth element is at least one element chosen from among Nd, Er, Dy, Pr, Tb and Eu.

4. The wavelength converter according to claim 3, wherein: the fiber is doped with the rare earth element at a concentration of 1000 to 3000 ppm.

5. The wavelength converter according to claim 2, wherein: the rare earth element is at least one element chosen from among Yb, Ce, Tm, Ho, Gd, Y and La.

6. The wavelength converter according to claim 5, wherein: the fiber is doped with the rare earth element at a concentration of 20000 to 30000 ppm.

7. The wavelength converter according to claim 2, wherein: the fiber includes a clad part, the clad part being doped with the rare earth element.

8. The wavelength converter according to claim 2, wherein: the fiber includes a core part, the core part being doped with the rare earth element.

9. The wavelength converter according to claim 2, wherein: the fiber is formed by optically connecting a first fiber formed with the first fiber grating and a second fiber formed with the second fiber grating.

10. The wavelength converter according to claim 2, wherein:
the fiber is made up of a first fiber formed with the first fiber grating, a second fiber, and a third fiber formed with the second fiber grating; and the first fiber and the third fiber are optically connected to both ends of the second fiber.

11. The wavelength converter according to claim 2, wherein:
the fiber has a double-clad structure.

12. The wavelength converter according to claim 11, wherein:
at least one clad part of the double-clad structure is doped with the rare earth element.

13. The wavelength converter according to claim 1, further comprising:
a detecting portion for detecting a part of the output of the fundamental wave; and
a controlling portion for controlling the output of a higher harmonic wave emitted from the wavelength conversion element, based on a value detected by the detecting portion.

14. The wavelength converter according to claim 13, wherein:
the controlling portion controls the temperature of at least one of the second fiber grating and the wavelength conversion element, based on data stored in advance in a table format.

15. The wavelength converter according to claim 14, wherein:
the controlling portion controls the temperature of at least one of the second fiber grating and the wavelength conversion element, based on a variation in a phase matching wavelength of the wavelength conversion element in accordance with the output of the fundamental wave.

16. The wavelength converter according to claim 14, wherein:
the controlling portion controls the temperature of at least one of the second fiber grating and the wavelength conversion element, based on a variation in a reflection wavelength of the second fiber grating in accordance with the output of the fundamental wave.

17. The wavelength converter according to claim 13, wherein:
the detecting portion includes a photo-detector that receives branch light of the fundamental wave from the fiber.

18. The wavelength converter according to claim 13, wherein:
the detecting portion includes a photo-detector that receives leakage light of the fundamental wave from the second fiber grating.

19. The wavelength converter according to claim 1, further comprising:
a detecting portion for detecting a part of the output of the higher harmonic wave; and
a controlling portion for controlling the temperature of the second fiber grating, based on a value of the output of the higher harmonic wave detected by the detecting portion.

20. The wavelength converter according to claim 1, wherein:
the wavelength of the higher harmonic wave is 510 to 550 nm and the output of the higher harmonic wave is 1 W or above.

21. The wavelength converter according to claim 1, wherein:
the wavelength of the higher harmonic wave is 440 to 490 nm and the output of the higher harmonic wave is 0.1 W or above.

22. A wavelength converter comprising:
a fiber including a laser active substance, the fiber being formed with a first fiber grating and a second fiber grating, wherein the first fiber grating and the second fiber grating are embedded in the fiber;
a laser light source that allows pumping light to be incident on the fiber;
a laser resonator formed by optically connecting the fiber and the laser light source;
a wavelength conversion element that converts the fundamental wave of a laser beam emitted from the laser resonator into a higher harmonic wave; and
a heating portion;
wherein the first fiber grating is arranged between the laser light source and the second fiber grating, and the second fiber grating is arranged between the first fiber grating and the wavelength conversion element,
wherein the heating portion absorbs a part of an output of the fundamental wave or the pumping light, and heats the second fiber grating, and
wherein the temperature of the second fiber grating is adjusted in accordance with an output of the higher harmonic wave outputted from the wavelength conversion element.

23. The wavelength converter according to claim 22, wherein:
the heating portion is a re-coating layer provided in an area where the second fiber grating is formed.

24. The wavelength converter according to claim 23, wherein:
the re-coating layer is made of an incombustible material.

25. The wavelength converter according to claim 23, wherein:
the material of the re-coating layer has a refractive index of 1.37 to 1.43.

26. The wavelength converter according to claim 22, wherein:
the heating portion includes a temperature control member which controls the temperature of the wavelength conversion element, and a holding base for holding the second fiber grating and the wavelength conversion element; and
heat produced from the temperature control member is transferred through the holding base to the second fiber grating, so that the second fiber grating is heated.

27. The wavelength converter according to claim 22, wherein:
the heating portion includes a hold member which absorbs leakage light of the fundamental wave or the pumping light and generates heat, the holding portion being made of a material having a greater thermal-expansion coefficient than the fiber, and the holding portion holds the second fiber grating; and
the hold member itself generates heat and expands thermally to apply a tensile stress to the second fiber grating.

* * * * *